(12) United States Patent
Chiyo et al.

(10) Patent No.: US 9,570,229 B2
(45) Date of Patent: Feb. 14, 2017

(54) POWER FEEDING COIL UNIT AND WIRELESS POWER TRANSMISSION DEVICE

(71) Applicant: TDK CORPORATION, Tokyo (JP)

(72) Inventors: Noritaka Chiyo, Tokyo (JP); Yasuhiro Terasaki, Tokyo (JP); Tetsuya Nishiyama, Tokyo (JP)

(73) Assignee: TDK CORPORATION, Tokyo (JP)

(*) Notice: Subject to any disclaimer, the term of this patent is extended or adjusted under 35 U.S.C. 154(b) by 93 days.

(21) Appl. No.: 14/549,118

(22) Filed: Nov. 20, 2014

(65) Prior Publication Data

US 2015/0145343 A1    May 28, 2015

(30) Foreign Application Priority Data

Nov. 28, 2013 (JP) ................... 2013-246449

(51) Int. Cl.

| | | |
|---|---|---|
| *H01F 27/28* | (2006.01) | |
| *H01F 27/34* | (2006.01) | |
| *H01F 27/24* | (2006.01) | |
| *H01F 5/00* | (2006.01) | |
| *H01F 27/38* | (2006.01) | |

(Continued)

(52) U.S. Cl.
CPC .......... *H01F 27/346* (2013.01); *B60L 11/182* (2013.01); *H01F 5/00* (2013.01); *H01F 27/24* (2013.01); *H01F 27/28* (2013.01); *H01F 27/2871* (2013.01); *H01F 27/38* (2013.01); *H01F 38/14* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .................. H01F 27/00–27/30; H01F 5/00
USPC .................. 307/104; 336/200, 232, 170–173
See application file for complete search history.

(56) References Cited

U.S. PATENT DOCUMENTS

| | | | |
|---|---|---|---|
| 4,873,677 A | 10/1989 | Sakamoto et al. | |
| 8,422,973 B2 * | 4/2013 | Takarada | ............ H01Q 7/00 340/572.1 |
| 9,318,258 B2 * | 4/2016 | Yamakawa | ............ H01F 38/14 |

(Continued)

FOREIGN PATENT DOCUMENTS

| | | |
|---|---|---|
| JP | S64-23730 A | 1/1989 |
| JP | H06-225482 A | 8/1994 |

(Continued)

OTHER PUBLICATIONS

May 19, 2015 Extended Search Report issued in European Patent Application No. 14194982.6.

(Continued)

*Primary Examiner* — Tuyen Nguyen
(74) *Attorney, Agent, or Firm* — Oliff PLC

(57) ABSTRACT

A power feeding coil unit includes a power feeding coil, and first and second auxiliary coils located outside of the region defined by a wire of the power feeding coil. The axis of the first auxiliary coil and the axis of the second auxiliary coil are substantially perpendicular to the axis of the power feeding coil. The power feeding coil and the first and second auxiliary coils simultaneously generate respective magnetic fluxes, each of which interlinks the corresponding one of the power feeding coil and the first and second auxiliary coils in a direction from the center to the outside of the power feeding coil unit.

6 Claims, 18 Drawing Sheets

(51) Int. Cl.
  *H01F 38/14* (2006.01)
  *B60L 11/18* (2006.01)

(56) References Cited

U.S. PATENT DOCUMENTS

| | | |
|---|---|---|
| 2002/0079863 A1 | 6/2002 | Abe et al. |
| 2012/0074899 A1 | 3/2012 | Tsai et al. |
| 2012/0119698 A1* | 5/2012 | Karalis ............... B60L 11/182 320/108 |
| 2013/0093253 A1* | 4/2013 | Norconk ............... H02J 5/005 307/104 |
| 2014/0084697 A1 | 3/2014 | Yasuda et al. |

FOREIGN PATENT DOCUMENTS

| | | |
|---|---|---|
| JP | H09-74034 A | 3/1997 |
| JP | H09-283346 A | 10/1997 |
| JP | 2002-199598 A | 7/2002 |
| JP | 2010-172084 A | 8/2010 |
| JP | 2012-151311 A | 8/2012 |
| JP | 2013-039027 A | 2/2013 |
| JP | 2013-207727 A | 10/2013 |
| WO | 2013/172336 A1 | 11/2013 |
| WO | 2014/119296 A1 | 8/2014 |

OTHER PUBLICATIONS

Jun. 1, 2015 Extended Search Report issued in European Patent Application No. 14194935.4.
Jul. 18, 2016 Office Action issued in Chinese Application No. 201410714380.5.
Jul. 28, 2016 Office Action Issued in U.S. Appl. No. 14/548,950.
Jul. 1, 2016 Office Action Issued in U.S. Appl. No. 14/548,420.
May 30, 2016 Office Action issued in Chinese Application No. 201410707722.0.

* cited by examiner

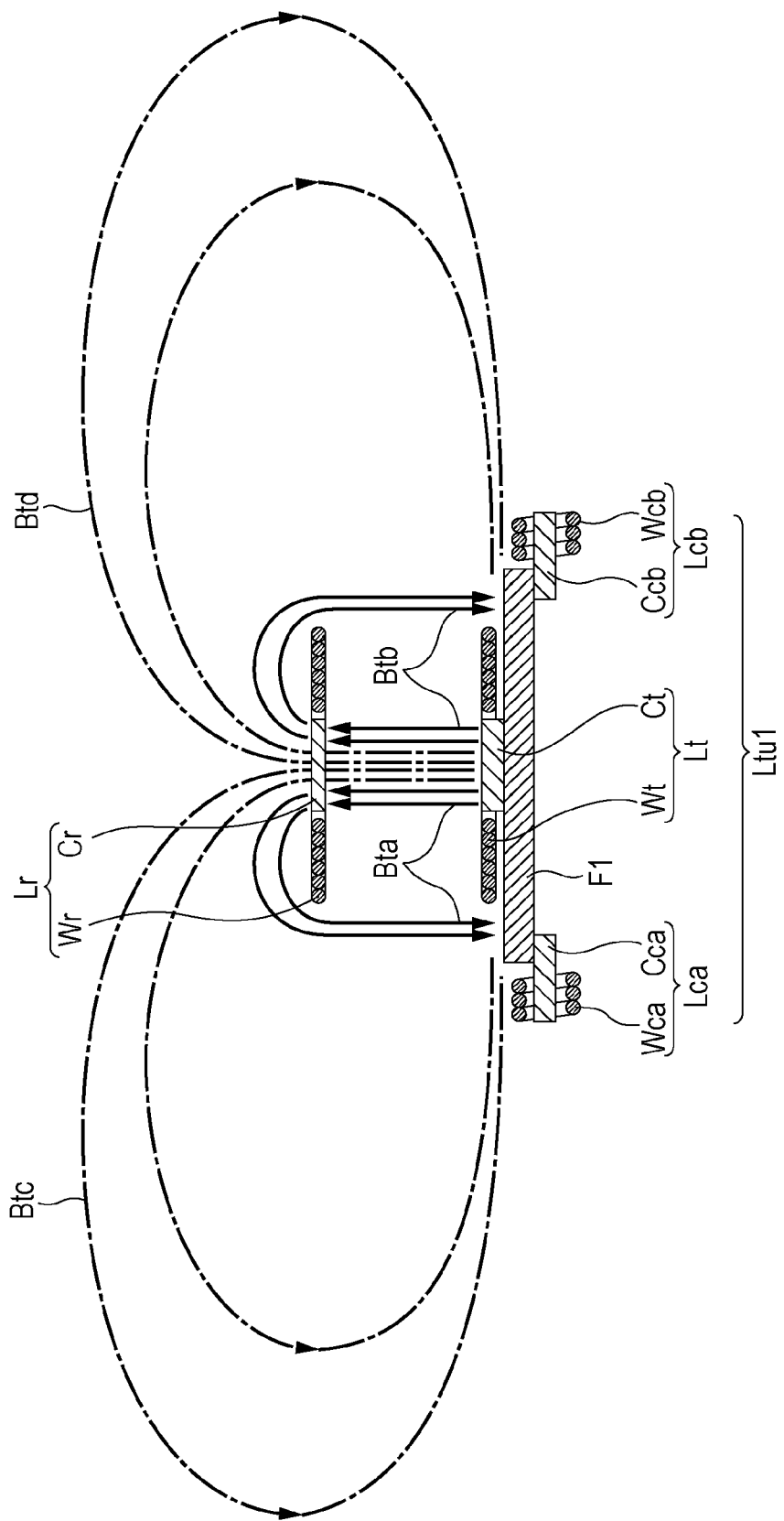

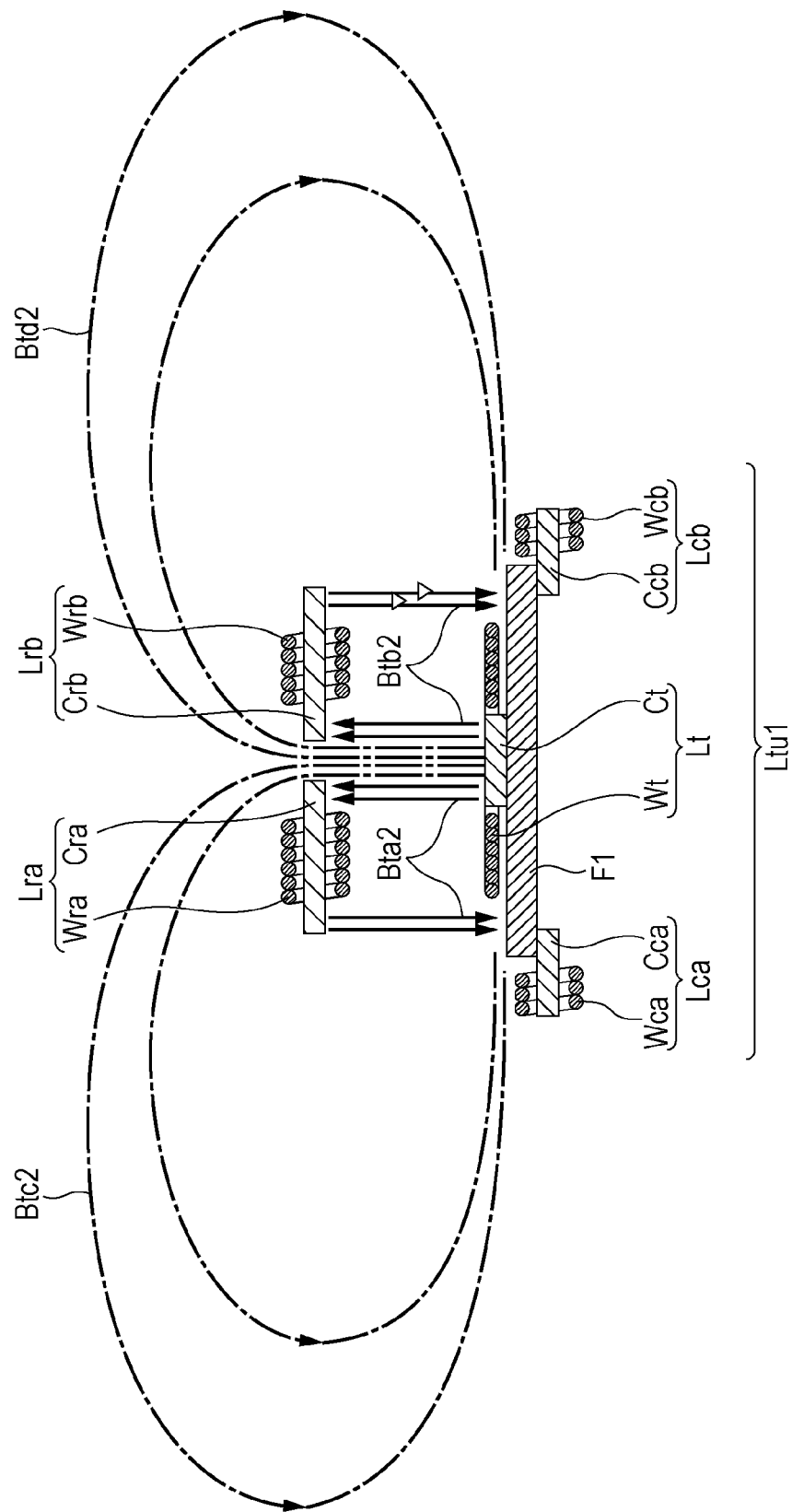

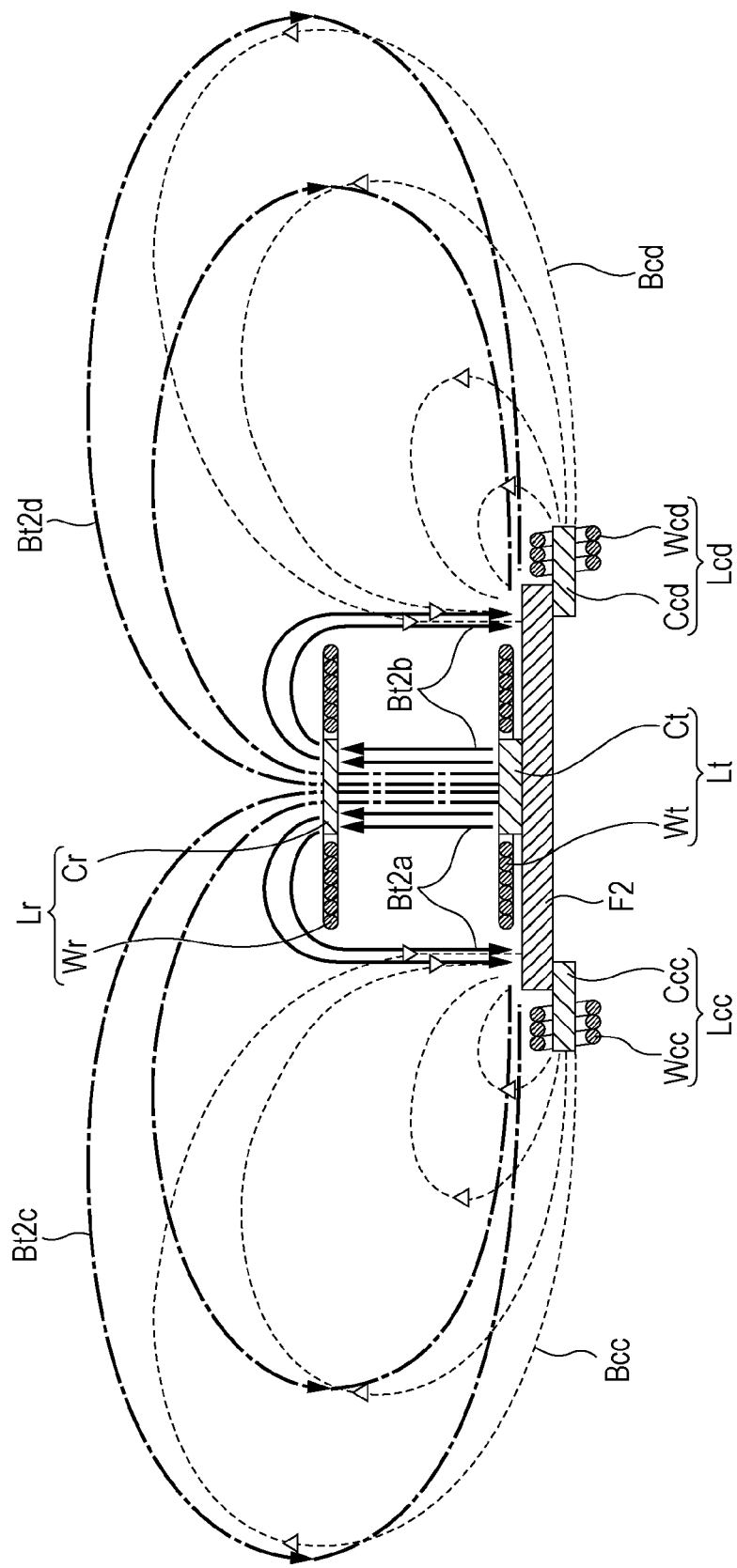

POWER FEEDING COIL UNIT AND WIRELESS POWER TRANSMISSION DEVICE

BACKGROUND OF THE INVENTION

1. Field of the Invention

The present invention relates to a power feeding coil unit and a wireless power transmission device for wireless transmission of power.

2. Description of the Related Art

Wireless power transmission technology that utilizes an electromagnetic induction effect between a primary (power feeding) coil and a secondary (power receiving) coil that face each other to transmit power without any mechanical contact such as a cable has attracted attention recently. There has been an increasing demand for the development of a technology that allows high-efficiency and low-loss power transmission.

In this situation, the issue of an unwanted leakage magnetic field formed around the power feeding coil due to the leakage magnetic flux of the power feeding coil has been gaining attention. For example, in the application of wireless power transmission technology to chargers for power electronic devices such as electric vehicles, due to the demand for high-power transmission, a large current needs to flow through the power feeding coil. In this case, the strength of the unwanted leakage magnetic field due to the leakage magnetic flux also increases, raising a concern of potentially inducing electromagnetic interference which might affect nearby electronic equipment and so forth.

To address the issue described above, for example, Japanese Unexamined Patent Application Publication No. 09-74034 discloses a technique for eliminating or reducing noise caused by the leakage magnetic flux of a coil for power transmission by using a noise canceling coil that interlinks with the magnetic flux created by the coil for power transmission.

However, in the technique disclosed in Japanese Unexamined Patent Application Publication No. 09-74034, since the magnetic flux created by the coil for power transmission interlinks with the noise canceling coil, even a magnetic flux that would contribute to power transmission might also be canceled, resulting in a reduction in power transmission efficiency.

SUMMARY OF THE INVENTION

Accordingly, an embodiment of the present invention provides a power feeding coil unit and a wireless power transmission device to prevent or minimize a reduction in power transmission efficiency while reducing an unwanted leakage magnetic field formed in a location away from a power feeding coil.

A power feeding coil unit according to an aspect of the present invention is a power feeding coil unit for wirelessly feeding power. The power feeding coil unit includes a power feeding coil having a wire wound in a planar shape, and at least one pair of auxiliary coils, each pair including a first auxiliary coil and a second auxiliary coil. The at least one pair of auxiliary coils are located on a rear side of the power feeding coil, and located outside of the region defined by the wire of the power feeding coil when viewed from an axial direction of the power feeding coil. An axis of the first auxiliary coil and an axis of the second auxiliary coil are nonparallel to an axis of the power feeding coil. The power feeding coil and the first and second auxiliary coils simultaneously generate magnetic fluxes, each of which interlinks the corresponding one of the power feeding coil and the first and second auxiliary coils in a direction from a center to an outside of the power feeding coil unit.

According to the aspect of the present invention, the first and second auxiliary coils are located on the rear side of the power feeding coil, and located outside of the region defined by the wire of the power feeding coil when viewed from the axial direction of the power feeding coil. The axes of the first and second auxiliary coils are nonparallel to the axis of the power feeding coil. The power feeding coil and the first and second auxiliary coils simultaneously generate magnetic fluxes, each of which interlinks the corresponding one of the power feeding coil and the first and second auxiliary coils in a direction from the center to the outside of the coil unit. This allows the magnetic flux generated by the power feeding coil and the magnetic flux generated by the first and second auxiliary coils to be oriented in opposite directions in a location away from the power feeding coil, and allows the magnetic flux generated by the power feeding coil and the magnetic flux generated by the first and second auxiliary coils to be oriented in the same directions in the vicinity of the power feeding coil. Accordingly, the magnetic field strength in a location away from the power feeding coil decreases, whereas the magnetic field strength in the vicinity of the power feeding coil increases. As a result, a reduction in power transmission efficiency may be prevented or minimized with a reduction in an unwanted leakage magnetic field formed in a location away from the power feeding coil.

Preferably, the axes of the first and second auxiliary coils are substantially perpendicular to the axis of the power feeding coil. In this case, the first and second auxiliary coils more easily a generate magnetic flux that circulates also in a location away from the first and second auxiliary coils. As a result, the effect of reducing an unwanted leakage magnetic field formed in a location away from the power feeding coil may further be enhanced.

Preferably, the power feeding coil further includes a magnetic core, and each of the first and second auxiliary coils includes a magnetic core. Preferably, the magnetic core of the first auxiliary coil is coupled to the magnetic core of the power feeding coil, and the magnetic core of the second auxiliary coil is coupled to the magnetic core of the power feeding coil. In this case, the first and second auxiliary coils more easily generate a magnetic flux that enhances a part of a magnetic field between the power feeding coil and the power receiving coil. That is, the magnetic flux generated by the power feeding coil and the magnetic flux generated by the first and second auxiliary coils are oriented in substantially the same direction between the power feeding coil and the power receiving coil. As a result, a reduction in power transmission efficiency may further be prevented or minimized.

More preferably, the first and second auxiliary coils are arranged so that the power feeding coil is located between the first and second auxiliary coils when viewed from an axial direction of the power feeding coil. In this case, the first and second auxiliary coils are located on both outer sides of the power feeding coil. Thus, an unwanted leakage magnetic field formed in a location away from a power feeding coil may further be reduced.

Preferably, the at least one pair of auxiliary coils includes a plurality of pairs of auxiliary coils, each pair including a first auxiliary coil and a second auxiliary coil, and an imaginary line connecting a center of the first auxiliary coil and a center of the second auxiliary coil in each of the plurality of pairs is nonparallel to an imaginary line connecting a center of the first auxiliary coil and a center of the second auxiliary coil in another of the plurality of pairs. In this case, a region where the strength of a magnetic field generated in a location away from the power feeding coil can be reduced is expanded. Thus, the effect of reducing an unwanted leakage magnetic field formed in a location away from the power feeding coil may further be enhanced.

A wireless power transmission device according to another aspect of the present invention includes the power feeding coil unit described above, and a power receiving coil. According to the aspect of the present invention, it may be possible to provide a wireless power transmission device that prevents or minimizes a reduction in power transmission efficiency while reducing an unwanted leakage magnetic field formed in a location away from a power feeding coil.

According to some aspects of the present invention, it may be possible to provide a power feeding coil unit and a wireless power transmission device that prevent or minimize a reduction in power transmission efficiency while reducing an unwanted leakage magnetic field formed in a location away from a power feeding coil.

BRIEF DESCRIPTION OF THE DRAWINGS

FIG. 4A is a diagram schematically illustrating the magnetic flux generated by a power feeding coil in FIG. 3.

FIG. 7A is a diagram schematically illustrating the magnetic flux generated by a power feeding coil in FIG. 6.

FIG. 11B is a diagram schematically illustrating the magnetic flux generated by the power feeding coil and the first and second auxiliary coils in FIG. 10B.

DESCRIPTION OF THE PREFERRED EMBODIMENTS

Embodiments of the present invention will be described in detail with reference to the drawings. In the following description, substantially the same elements or elements having substantially the same function are given the same numerals or signs, and are not described again.

First Embodiment

Figure 1:
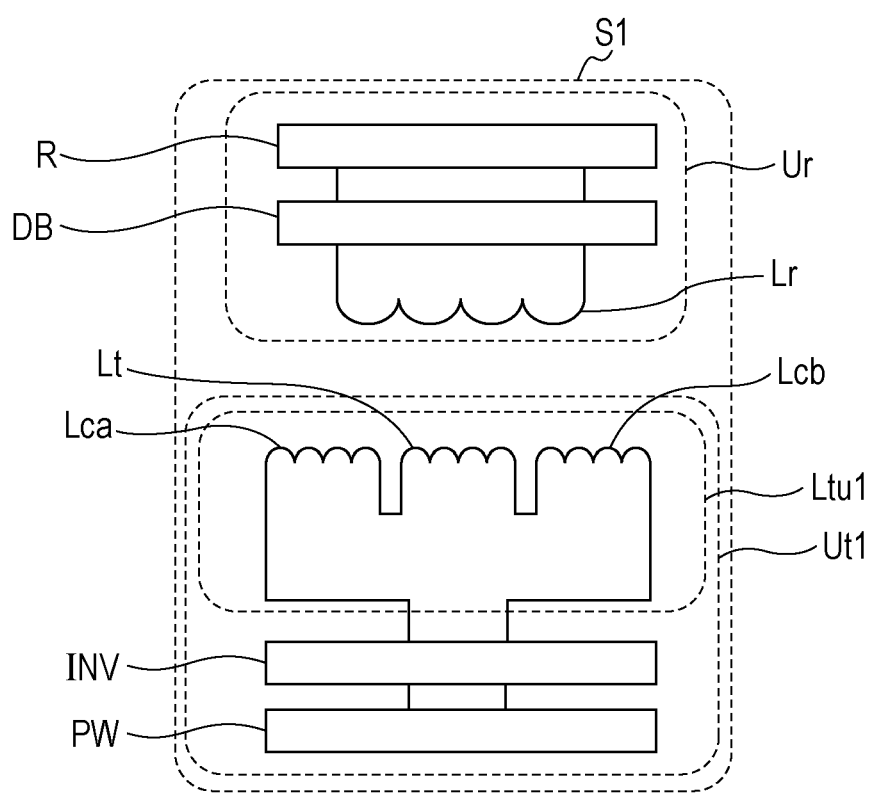
FIG. 1 is a system configuration diagram illustrating a wireless power transmission device according to a first embodiment of the present invention together with a load.
Figure 2:
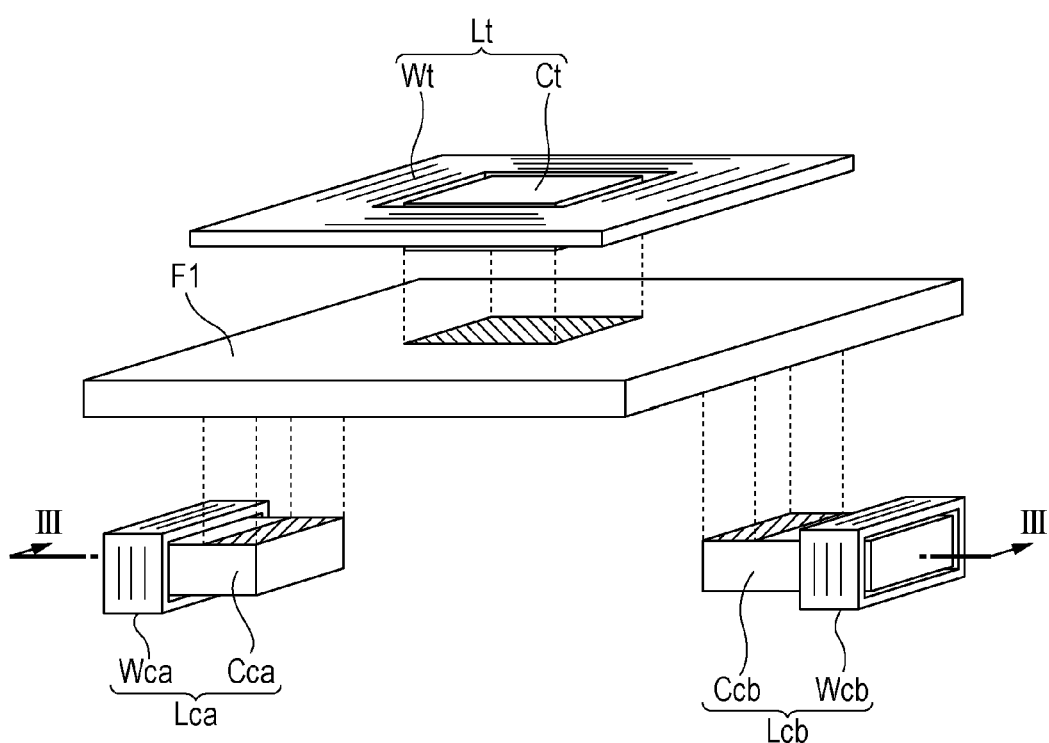
FIG. 2 is an exploded perspective view of a power feeding coil unit according to the first embodiment of the present invention.
Figure 3:
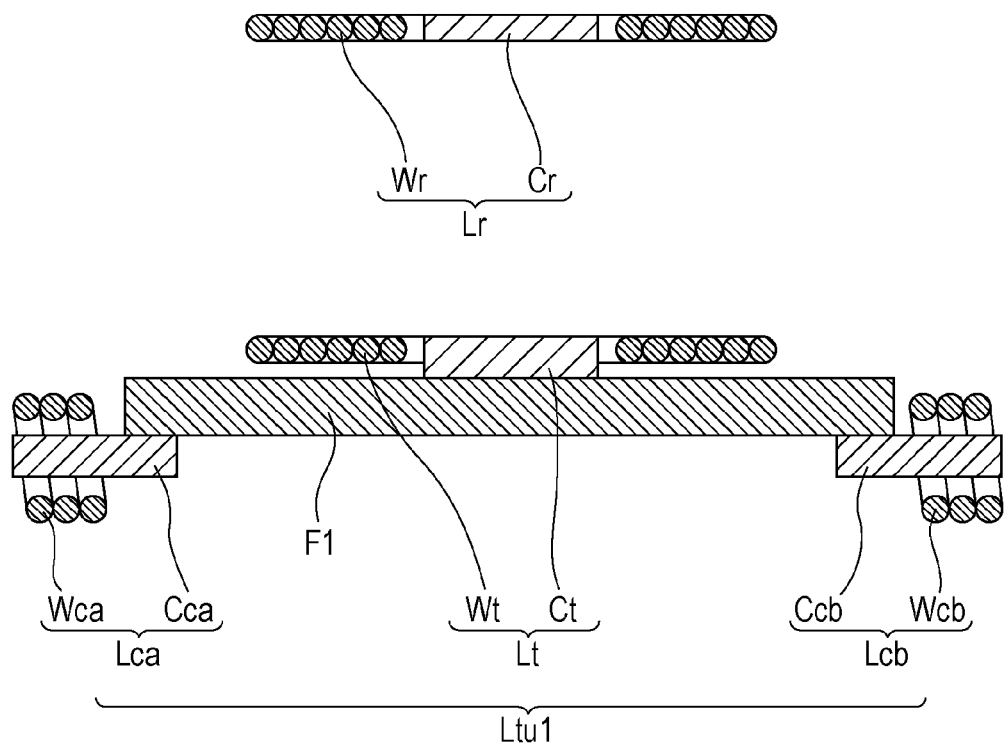
FIG. 3 is a schematic cross-sectional view of the power feeding coil unit, taken along line III-III in FIG. 2, together with a power receiving coil.

First, a configuration of a wireless power transmission device S1 according to a first embodiment of the present invention will be described with reference to FIGS. 1 to 3. FIG. 1 is a system configuration diagram illustrating a wireless power transmission device according to the first embodiment of the present invention together with a load. FIG. 2 is an exploded perspective view of a power feeding coil unit according to the first embodiment of the present invention. FIG. 3 is a schematic cross-sectional view of the power feeding coil unit, taken along line III-III in FIG. 2, together with a power receiving coil.

As illustrated in FIG. 1, the wireless power transmission device S1 includes a wireless power feeding device Ut1 and a wireless power receiving device Ur. The wireless power feeding device Ut1 includes a power source PW, an inverter INV, and a power feeding coil unit Ltu1. The wireless power receiving device Ur includes a power receiving coil Lr and a rectifier circuit DB.

The power source PW supplies direct-current (DC) power to the inverter INV, described below. The power source PW is not limited to any particular one, and may be any power source that outputs DC power. Examples of such a power source may include a DC power source that is generated by rectifying and smoothing a commercial alternating-current (AC) power source, a secondary battery, a solar photovoltaic DC power source, and a switching power source device such as a switching converter.

The inverter INV has a function to convert input DC power supplied from the power source PW into AC power. In this embodiment, the inverter INV converts input DC power supplied from the power source PW into AC power, and supplies the AC power to the power feeding coil unit Ltu1 described below. The inverter INV may be implemented as a switching circuit having a plurality of switching elements bridge-connected. Examples of the switching elements of the switching circuit may include metal oxide semiconductor-field effect transistor (MOSFET) elements and insulated gate bipolar transistor (IGBT) elements.

The power feeding coil unit Ltu1 includes a power feeding coil Lt, a first auxiliary coil Lca, a second auxiliary coil Lcb, and a magnetic body F1. In this embodiment, as illustrated in FIG. 1, three coils, that is, the power feeding coil Lt and the first and second auxiliary coils Lca and Lcb, are electrically connected in series with one another. In a case where the wireless power transmission device S1 according to this embodiment is used for an electric power supply facility for a vehicle such as an electric vehicle, the power feeding coil unit Ltu1 will be installed in or on, or near, the ground.

The individual coils included in the power feeding coil unit Ltu1 will now be described. The power feeding coil Lt includes a magnetic core Ct and a wire Wt. The power feeding coil Lt is a planar-shaped spiral coil having a substantially rectangular shape, and is formed by winding the wire Wt, which is made of a Litz wire such as a copper wire or an aluminum wire, around the magnetic core Ct, which is shaped into a plate or a bar. The axial direction of the power feeding coil Lt is parallel to the opposing direction of the power feeding coil Lt and the power receiving coil Lr described below. The number of turns of the power feeding coil Lt is appropriately set on the basis of the separation distance between the power feeding coil Lt and the power receiving coil Lr described below, the desired power transmission efficiency, and so forth.

The first auxiliary coil Lca includes a magnetic core Cca and a wire Wca. The first auxiliary coil Lca is a solenoid coil having a wire wound in a helical shape, and is formed by winding the wire Wca, which is made of a Litz wire such as a copper wire or an aluminum wire, around the magnetic core Cca, which is shaped into a plate or a bar. The axial direction of the first auxiliary coil Lca is nonparallel to the axial direction of the power feeding coil Lt. The configuration described above allows the magnetic flux generated by the first auxiliary coil Lca to easily circulate also in a location away from the first auxiliary coil Lca without interlinking with the power receiving coil Lr described below. In this embodiment, the axial direction of the first auxiliary coil Lca is perpendicular to the axial direction of the power feeding coil Lt. In this case, the first auxiliary coil Lca more facilitates the generation of a magnetic flux circulating also in a location away from the first auxiliary coil Lca.

In addition, the first auxiliary coil Lca is located on the rear side of the power feeding coil. Lt. That is, the first auxiliary coil Lca is located on the opposite to a side of the power feeding coil Lt facing the power receiving coil Lr described below. The arrangement described above allows the first auxiliary coil Lca to easily generate a magnetic flux that enhances a part of the magnetic field between the power feeding coil Lt and the power receiving coil Lr described below. As a result, a reduction in power transmission efficiency may further be prevented or minimized.

Furthermore, when the power feeding coil Lt generates a magnetic flux interlinking the power feeding coil Lt in the direction from the center to the outside of the power feeding coil unit Ltu1, the first auxiliary coil Lca generates a magnetic flux interlinking the first auxiliary coil Lca in the direction from the center to the outside of the power feeding coil unit Ltu1. Specifically, in FIG. 3, when the magnetic flux generated by the power feeding coil Lt interlinks the power feeding coil Lt in the direction from the power feeding coil Lt to the power receiving coil Lr described below (i.e., vertically upward in FIG. 3), it may be sufficient that the magnetic flux generated by the first auxiliary coil Lca interlinks the first auxiliary coil Lca in the direction from the power feeding coil Lt to the first auxiliary coil Lca (i.e., horizontally leftward in FIG. 3). In order to generate the magnetic flux described above, in FIG. 3, it may be sufficient to wind the wire Wca of the first auxiliary coil Lca around the magnetic core Cca so that the direction of the current flowing through a portion of the wire Wca of the first auxiliary coil Lca in closest proximity to the wire Wt of the power feeding coil Lt (i.e., the upper portion of the wire Wca of the first auxiliary coil Lca in FIG. 3) is opposite to the direction of the current flowing through a portion of the wire Wt of the power feeding coil Lt in most proximity to the wire Wca of the first auxiliary coil Lca (i.e., the left-hand portion of the wire Wt of the power feeding coil Lt in FIG. 3). In this embodiment, the power feeding coil Lt and the first auxiliary coil Lca are electrically connected in series with each other. With the configuration of the power feeding coil Lt and the first auxiliary coil Lca described above, when the power feeding coil Lt generates a magnetic flux interlinking the power feeding coil Lt in the direction from the outside to the center of the power feeding coil unit Ltu1, the first auxiliary coil Lca also generates a magnetic flux interlinking the first auxiliary coil Lca in the direction from the outside to the center of the power feeding coil unit Ltu1.

The second auxiliary coil Lcb includes a magnetic core Ccb and a wire Wcb. The second auxiliary coil Lcb is a solenoid coil having a wire wound in a helical shape, and is formed by winding the wire Wcb, which is made of a Litz wire such as a copper wire or an aluminum wire, around the magnetic core Ccb, which is shaped into a plate or a bar. The axial direction of the second auxiliary coil Lcb is nonparallel to the axial direction of the power feeding coil Lt. The configuration described above allows the magnetic flux generated by the second auxiliary coil Lcb to easily circulate also in a location away from the second auxiliary coil Lcb without interlinking with the power receiving coil Lr described below. In this embodiment, the axial direction of the second auxiliary coil Lcb is perpendicular to the axial direction of the power feeding coil Lt. In this case, the second auxiliary coil Lcb more facilitates the generation of a magnetic flux circulating also in a location away from the second auxiliary coil Lcb.

In addition, the second auxiliary coil Lcb is located on the rear side of the power feeding coil Lt. That is, the second auxiliary coil Lcb is located on the opposite to the side of the power feeding coil Lt facing the power receiving coil Lr described below. The arrangement described above allows the second auxiliary coil Lcb to easily generate a magnetic flux that enhances a part of the magnetic field between the power feeding coil Lt and the power receiving coil Lr described below. As a result, a reduction in power transmission efficiency may further be prevented or minimized.

Furthermore, when the power feeding coil Lt generates a magnetic flux interlinking the power feeding coil Lt in the direction from the center to the outside of the power feeding coil unit Ltu1, the second auxiliary coil Lcb generates a magnetic flux interlinking the second auxiliary coil Lcb in the direction from the center to the outside of the power feeding coil unit Ltu1. Specifically, in FIG. 3, when the magnetic flux generated by the power feeding coil Lt interlinks the power feeding coil Lt in the direction from the power feeding coil Lt to the power receiving coil Lr described below (i.e., vertically upward in FIG. 3), it may be sufficient that the magnetic flux generated by the second auxiliary coil Lcb interlinks the second auxiliary coil Lcb in the direction from the power feeding coil Lt to the second auxiliary coil Lcb (i.e., horizontally rightward in FIG. 3). In order to generate the magnetic flux described above, in FIG.

3, it may be sufficient to wind the wire Wcb of the second auxiliary coil. Lcb around the magnetic core Ccb so that the direction of the current flowing through a portion of the wire Wcb of the second auxiliary coil Lcb in closest proximity to the wire Wt of the power feeding coil Lt (i.e., the upper portion of the wire Wcb of the second auxiliary coil Lcb in FIG. 3) is the same as the direction of the current flowing through a portion of the wire Wt of the power feeding coil Lt in most proximity to the wire Wcb of the second auxiliary coil Lcb (i.e., the right-hand portion of the wire Wt of the power feeding coil Lt in FIG. 3). In this embodiment, the power feeding coil Lt and the second auxiliary coil Lcb are electrically connected in series with each other. With the configuration of the power feeding coil Lt and the second auxiliary coil Lcb described above, when the power feeding coil Lt generates a magnetic flux interlinking the power feeding coil Lt in the direction from the outside to the center of the power feeding coil unit Ltu1, the second auxiliary coil Lcb also generates a magnetic flux interlinking the second auxiliary coil Lcb in the direction from the outside to the center of the power feeding coil unit Ltu1.

The magnetic body F1 extends along the opposite surface to a side of the power feeding coil Lt facing the power receiving coil Lr described below. In this embodiment, when the magnetic body F1 is viewed from the axial direction of the power feeding coil Lt, the magnetic body F1 has an elongated rectangular shape with long sides being longer than the power feeding coil Lt and short sides being shorter than the power feeding coil Lt. The magnetic body F1 and the magnetic core Ct of the power feeding coil Lt are connected to each other near the center of the surface on the side of the magnetic body F1 facing the power receiving coil Lr described below. The magnetic body F1 is further connected to each of the magnetic core Cca of the first auxiliary coil Lca and the magnetic core Ccb of the second auxiliary coil Lcb near either end of the magnetic body F1, which is elongated rectangular in shape, in its long-side direction on the opposite surface to the side of the magnetic body F1 facing the power receiving coil Lr described below. That is, the magnetic core Cca of the first auxiliary coil Lca is coupled to the magnetic core Ct of the power feeding coil Lt, and the magnetic core Ccb of the second auxiliary coil Lcb is coupled to the magnetic core Ct of the power feeding coil Lt. With the configuration described above, the first and second auxiliary coils Lca and Lcb are arranged so that the power feeding coil Lt is located between the first and second auxiliary coils Lca and Lcb when viewed from the axial direction of the power feeding coil Lt. In this case, the first and second auxiliary coils Lca and Lcb are configured so as to be located on both outer sides of the power feeding coil Lt. Thus, a further reduction in an unwanted leakage magnetic field formed in a location away from the power feeding coil Lt may be achieved.

As illustrated in FIG. 3, the power receiving coil Lr includes a magnetic core Cr and a wire Wr. The power receiving coil Lr is a planar-shaped spiral coil having a substantially rectangular shape, and is formed by winding the wire Wr around the magnetic core Cr, which is shaped into a plate or a bar. The power receiving coil Lr has a function to receive the AC power fed from the power feeding coil Lt of the power feeding coil unit Ltu1. In a case where the wireless power transmission device S1 according to this embodiment is used for an electric power supply facility for a vehicle such as an electric vehicle, the power receiving coil Lr will be mounted on the bottom of the vehicle.

The rectifier circuit DB has a function to rectify the AC power received by the power receiving coil Lr to DC power. Examples of the rectifier circuit DB may include a converter circuit having a full-wave rectifying function that uses a diode bridge and a power smoothing function that uses a capacitor and a three-terminal regulator. The DC power obtained by rectification by the rectifier circuit DB is output to a load R. Examples of the load R may include, in a case where the wireless power transmission device S1 according to this embodiment is used for an electric power supply facility for a vehicle such as an electric vehicle, a secondary battery and a rotating machine that are included in the vehicle. In a case where the load R is an AC rotating machine, the wireless power receiving device Ur will require an additional inverter (not illustrated) between the rectifier circuit DB and the load R to supply AC power to the AC rotating machine.

Figure 4B:
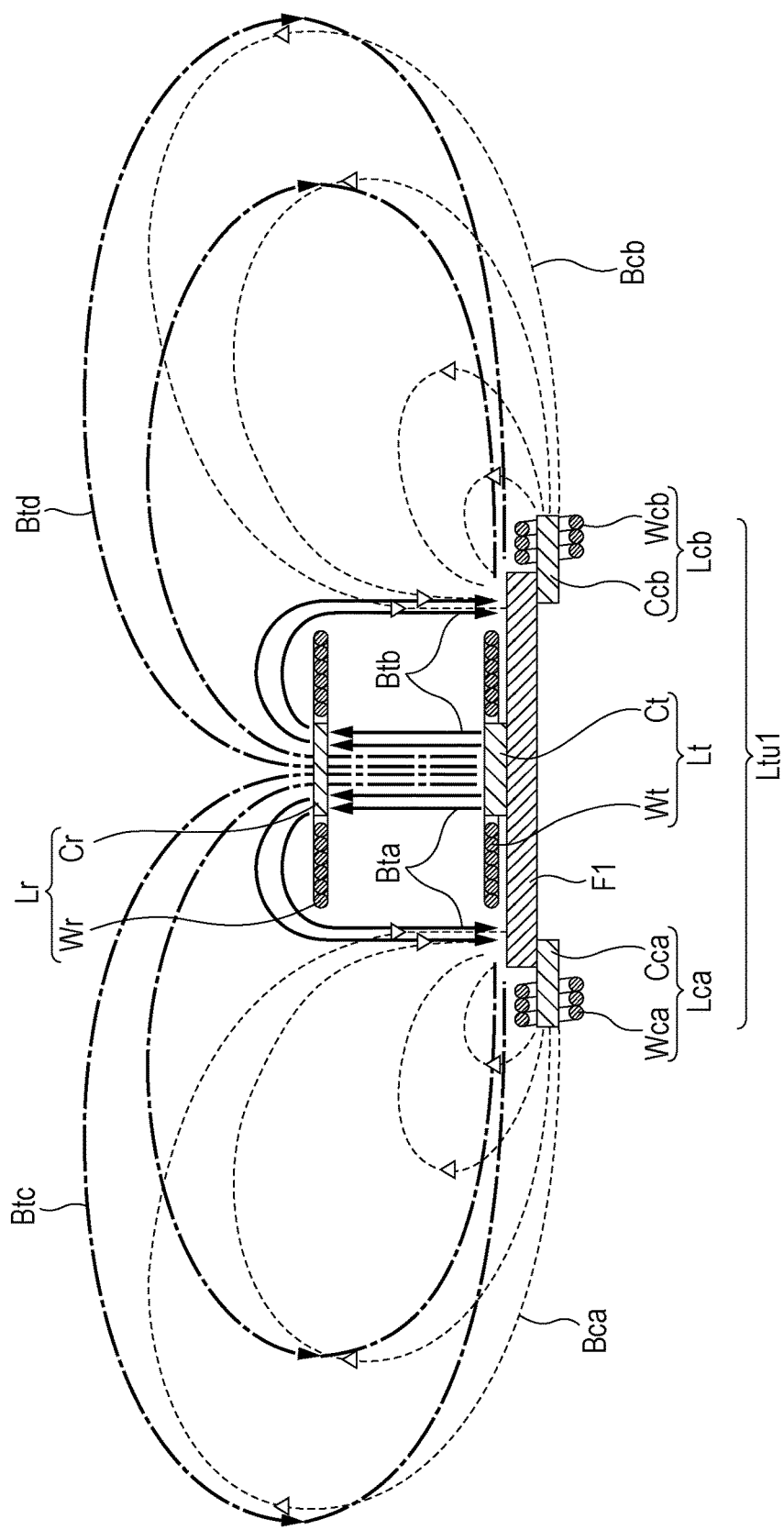
FIG. 4B is a diagram schematically illustrating the magnetic flux generated by the power feeding coil and first and second auxiliary coils in FIG. 3.

The relative relationship between the magnetic flux generated by a power feeding coil and the magnetic flux generated by an auxiliary coil and the effect of reducing the unwanted leakage magnetic field in this embodiment will now be described in detail with reference to FIGS. 4A and 4B. FIG. 4A is a diagram schematically illustrating the magnetic flux generated by the power feeding coil Lt in FIG. 3. FIG. 4B is a diagram schematically illustrating the magnetic flux generated by the power feeding coil Lt and the first and second auxiliary coils Lca and Lcb in FIG. 3. In FIG. 4A, magnetic fluxes Bta to Btd are illustrated as typical magnetic fluxes generated by the power feeding coil Lt. In FIG. 4B, magnetic fluxes Bta to Btd are illustrated as typical magnetic fluxes generated by the power feeding coil Lt, and magnetic fluxes Bca and Bcb are schematically illustrated as typical magnetic fluxes generated by the first and second auxiliary coils Lca and Lcb. Note that the illustrated magnetic fluxes schematically depict only the orientations of the individual magnetic fluxes, and do not depict the magnetic flux densities. In FIG. 4A and FIG. 4B, the magnetic flux in the magnetic core Ct of the power feeding coil. Lt, the magnetic cores Cca and Ccb of the first and second auxiliary coils Lca and Lcb, the magnetic body F1, and the magnetic core Cr of the power receiving coil Lr is not illustrated.

First, the magnetic flux generated by the power feeding coil Lt will be described with reference to FIG. 4A. As illustrated in FIG. 4A, the power feeding coil Lt generates the magnetic fluxes Bta to Btd that interlink in the direction from a center portion of the power feeding coil Lt to the power receiving coil Lr (i.e., vertically upward in FIG. 4A). The magnetic fluxes Bta to Btd generated by the power feeding coil Lt also interlink with the power receiving coil Lr. The interlinking of the magnetic fluxes Bta to Btd with the power receiving coil Lr induces an electromotive force in the wire Wr of the power receiving coil Lr. The power generated in the power receiving coil Lr is rectified by the rectifier circuit DB, and is output to the load R.

The magnetic flux generated by the first and second auxiliary coils Lca and Lcb will now be described with reference to FIG. 4B. The magnetic fluxes Bta to Btd generated by the power feeding coil Lt in FIG. 4B are as illustrated in FIG. 4A. As illustrated in FIG. 4B, the first auxiliary coil Lca generates a magnetic flux Bca that interlinks the first auxiliary coil Lca in the direction from the power feeding coil Lt to the first auxiliary coil Lca (i.e., horizontally leftward in FIG. 4B) and that does not interlink with the power feeding coil Lt and the power receiving coil Lr and circulates in the direction from the power receiving coil Lr to the first auxiliary coil Lca (i.e., vertically downward in FIG. 4B). Specifically, since the axial direction of the first auxiliary coil Lca is nonparallel to the axial direction of the power feeding coil Lt, the magnetic flux Bca generated by the first auxiliary coil Lca circulates in a location away from the first auxiliary coil Lca without interlinking with the power receiving coil Lr. In particular, in this embodiment, since the axial direction of the first auxiliary coil Lca is perpendicular to the axial direction of the power feeding coil Lt, the magnetic flux Bca generated by the first auxiliary coil Lca largely circulates also in a location away from the first auxiliary coil Lca.

Likewise, as illustrated in FIG. 4B, the second auxiliary coil Lcb generates a magnetic flux Bcb that interlinks the second auxiliary coil Lcb in the direction from the power feeding coil Lt to the second auxiliary coil Lcb (i.e., horizontally rightward in FIG. 4B) and that does not interlink with the power feeding coil Lt and the power receiving coil Lr and circulates in the direction from the power receiving coil Lr to the second auxiliary coil Lcb (i.e., vertically downward in FIG. 4B). Specifically, since the axial direction of the second auxiliary coil Lcb is nonparallel to the axial direction of the power feeding coil Lt, the magnetic flux Bcb generated by the second auxiliary coil Lcb circulates in a location away from the second auxiliary coil Lcb without interlinking with the power receiving coil Lr. In particular, in this embodiment, since the axial direction of the second auxiliary coil Lcb is perpendicular to the axial direction of the power feeding coil Lt, the magnetic flux Bcb generated by the second auxiliary coil Lcb largely circulates also in a location away from the second auxiliary coil Lcb.

Next, the effect of reducing the unwanted leakage magnetic field in this embodiment will be described. Among the magnetic fluxes Bta to Btd generated by the power feeding coil Lt described above, the magnetic fluxes Bta and Btb are magnetic fluxes that circulate relatively in the vicinity of the power feeding coil Lt, and the magnetic fluxes Btc and Btd are magnetic fluxes that largely circulate also in a location away from the power feeding coil Lt. That is, a leakage magnetic field is formed in a location away from the power feeding coil. Lt by using the magnetic fluxes Btc and Btd. The magnetic fluxes Btc and Btd that largely circulate also in a location away from the power feeding coil Lt have a significantly lower magnetic flux density than the magnetic fluxes Bta and Btb that circulate in the vicinity of the power feeding coil Lt. However, a large current flowing in a coil for high-power transmission may permit the leakage magnetic field formed in a location away from the power feeding coil Lt by using the magnetic fluxes Btc and Btd to have a strength that might be enough to cause electromagnetic interference. When a comparison is made between the orientation of the magnetic flux Btc generated by the power feeding coil Lt and the orientation of the magnetic flux Bca generated by the first auxiliary coil Lca in a location away from the power feeding coil Lt, the magnetic flux Btc and the magnetic flux Bca are oriented in opposite directions. Similarly, when a comparison is made between the orientation of the magnetic flux Btd generated by the power feeding coil Lt and the orientation of the magnetic flux Bcb generated by the second auxiliary coil Lcb in a location away from the power feeding coil Lt, the magnetic flux Btd and the magnetic flux Bcb are oriented in opposite directions. That is, the magnetic fluxes Btc and Btd generated by the power feeding coil Lt and the magnetic fluxes Bca and Bcb generated by the first and second auxiliary coils Lca and Lcb cancel each other out in a location away from the power feeding coil Lt. As a result, the unwanted leakage magnetic field may be reduced.

On the other hand, the magnetic flux Bta generated by the power feeding coil Lt and the magnetic flux Bca generated by the first auxiliary coil Lca are oriented in the same direction near between the power feeding coil Lt and the power receiving coil Lr. That is, the magnetic field generated by the first auxiliary coil Lca enhances a part of the magnetic field between the power feeding coil Lt and the power receiving coil Lr. In this manner, the magnetic flux Bta generated by the power feeding coil Lt and the magnetic flux Bca generated by the first auxiliary coil Lca are oriented in substantially the same direction between the power feeding coil Lt and the power receiving coil Lr. Accordingly, the magnetic flux Bta interlinking both the power feeding coil Lt and the power receiving coil Lr, which contributes to power transmission, is not canceled by the magnetic flux Bca generated by the first auxiliary coil Lca. As a result, a reduction in power transmission efficiency may be prevented or minimized. Likewise, the magnetic flux Btb generated by the power feeding coil Lt and the magnetic flux Bcb generated by the second auxiliary coil Lcb are oriented in the same direction. That is, the magnetic field generated by the second auxiliary coil Lcb enhances a part of the magnetic field between the power feeding coil. Lt and the power receiving coil Lr. In this manner, the magnetic flux Btb generated by the power feeding coil Lt and the magnetic flux Bcb generated by the second auxiliary coil. Lcb are oriented in substantially the same direction between the power feeding coil Lt and the power receiving coil Lr. Accordingly, the magnetic flux Btb interlinking both the power feeding coil Lt and the power receiving coil Lr, which contributes to power transmission, is not canceled by the magnetic flux Bcb generated by the second auxiliary coil Lcb. As a result, a reduction in power transmission efficiency may be prevented or minimized. As described above, among the magnetic fluxes Bta to Btd interlinking both the power feeding coil Lt and the power receiving coil Lr, the magnetic fluxes Btc and Btd that circulate also in a location away from the power feeding coil Lt are canceled by the magnetic fluxes Bca and Bcb generated by the first and second auxiliary coils Lca and Lcb. The magnetic fluxes Btc and Btd that largely circulate also in a location away from the power feeding coil Lt have a significantly lower magnetic flux density than the magnetic fluxes Bta and Btb that circulate in the vicinity of the power feeding coil Lt. Accordingly, a reduction in power transmission efficiency due to the cancellation of the magnetic fluxes Btc and Btd that largely circulate also in a location away from the power feeding coil. Lt is not significant.

In the manner described above, in the power feeding coil unit Ltu1 according to this embodiment, the first and second auxiliary coils Lca and Lcb are located on the rear side of the power feeding coil Lt outside of the region defined by the wire Wt of the power feeding coil Lt when viewed from the axial direction of the power feeding coil Lt. In addition, and the axes of the first and second auxiliary coils Lca and Lcb are nonparallel to the axis of the power feeding coil. Lt, and the power feeding coil Lt and the first and second auxiliary coils Lca and Lcb simultaneously generate respective magnetic fluxes, each magnetic flux interlinking the corresponding one of the power feeding coil Lt and the first and second auxiliary coils Lca and Lcb, in a direction from the center to the outside of the power feeding coil unit Ltu1. Thus, the magnetic fluxes Btc and Btd generated by the power feeding coil Lt and the magnetic fluxes Bca and Bcb generated by the first and second auxiliary coils Lca and Lcb are oriented in opposite directions in a location away from the power feeding coil Lt, whereas the magnetic fluxes Bta and Btb generated by the power feeding coil Lt and the magnetic fluxes Bca and Bcb generated by the first and second auxiliary coils Lca and Lcb are oriented in the same direction in the vicinity of the power feeding coil Lt. Accordingly, the magnetic field strength in a location away from the power feeding coil Lt decreases, whereas the magnetic field strength in the vicinity of the power feeding coil Lt increases. As a result, a reduction in power transmission efficiency may be prevented or minimized with a reduction in an unwanted leakage magnetic field formed in a location away from the power feeding coil Lt.

Second Embodiment

Figure 5:
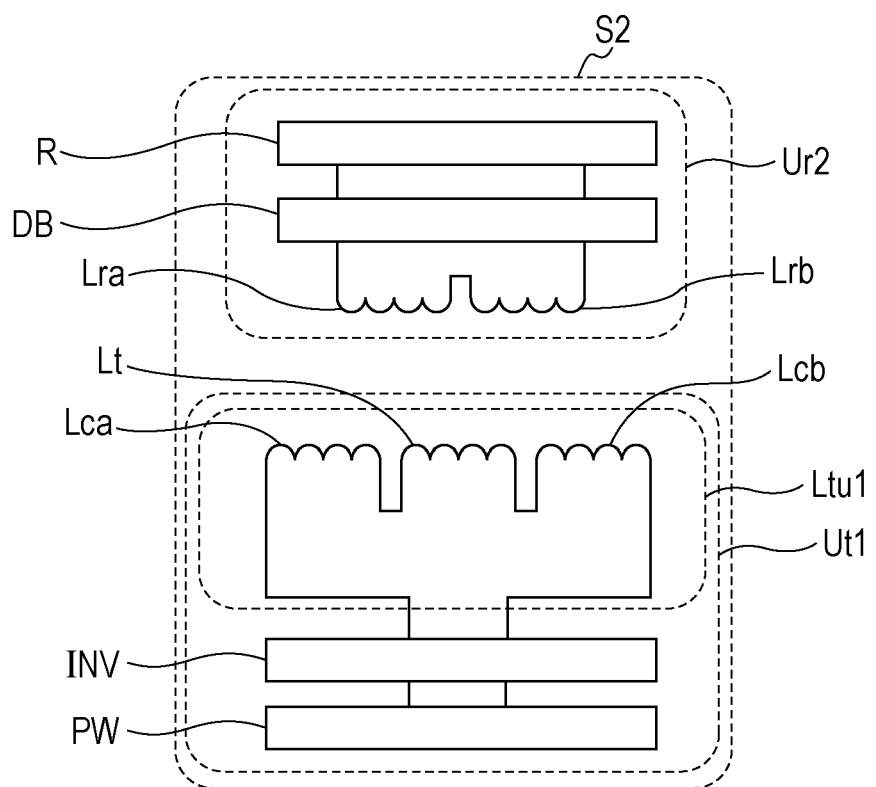
FIG. 5 is a system configuration diagram illustrating a wireless power transmission device according to a second embodiment of the present invention together with a load.
Figure 6:
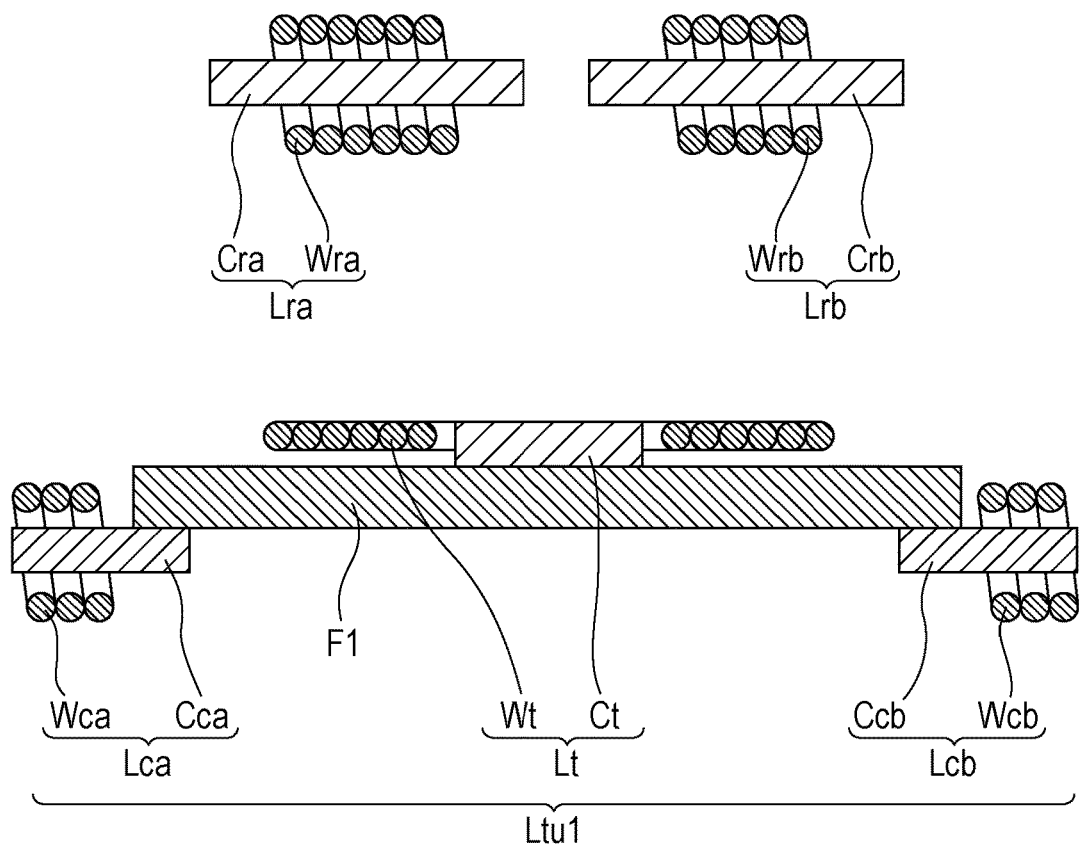
FIG. 6 is a schematic cross-sectional view of a power feeding coil unit according to the second embodiment of the present invention together with first and second power receiving coils, which corresponds to the schematic cross-sectional view of the power feeding coil unit according to the first embodiment illustrated in FIG. 3, taken along line III-III in FIG. 2.

Next, a configuration of a wireless power transmission device S2 according to a second embodiment of the present invention will be described with reference to FIG. 5 and FIG. 6. FIG. 5 is a system configuration diagram illustrating a wireless power transmission device according to the second embodiment of the present invention together with a load. FIG. 6 is a schematic cross-sectional view of a power feeding coil unit according to the second embodiment of the present invention together with first and second power receiving coils, which corresponds to the schematic cross-sectional view of the power feeding coil unit according to the first embodiment illustrated in FIG. 3, taken along line III-III in FIG. 2.

As illustrated in FIG. 5, the wireless power transmission device S2 includes a wireless power feeding device Ut1 and a wireless power receiving device Ur2. The wireless power feeding device Ut1 includes a power source PW, an inverter INV, and a power feeding coil unit Ltu1. The wireless power receiving device Ur2 includes first and second power receiving coils Lra and Lrb and a rectifier circuit DB. The configuration of the power source PW, the inverter INV, the power feeding coil unit Ltu1, and the rectifier circuit DB is similar to that in the wireless power transmission device S1 according to the first embodiment. The wireless power transmission device S2 according to this embodiment is different from the wireless power transmission device S1 according to the first embodiment in that the wireless power transmission device S2 includes the first and second power receiving coils Lra and Lrb in place of the power receiving coil Lr of the wireless power transmission device S1 according to the first embodiment. In the following, a description will be given mainly of the differences from the first embodiment.

As illustrated in FIG. 6, the first power receiving coil Lra is a solenoid coil wound in a helical shape, and is formed by winding a wire Wra around a magnetic core Cra shaped into a plate or a bar.

As illustrated in FIG. 6, the second power receiving coil Lrb is a solenoid coil wound in a helical shape, and is formed by winding a wire Wrb around a magnetic core Crb shaped into a plate or a bar.

The first and second power receiving coils Lra and Lrb are apposed in the same plane, and, as illustrated in FIG. 5, are electrically connected in series with each other. The axis of the first power receiving coil Lra and the axis of the second power receiving coil Lrb are aligned with each other. In addition, the wire Wra of the first power receiving coil Lra and the wire Wrb of the second power receiving coil Lrb are wound in opposite directions.

Figure 7B:
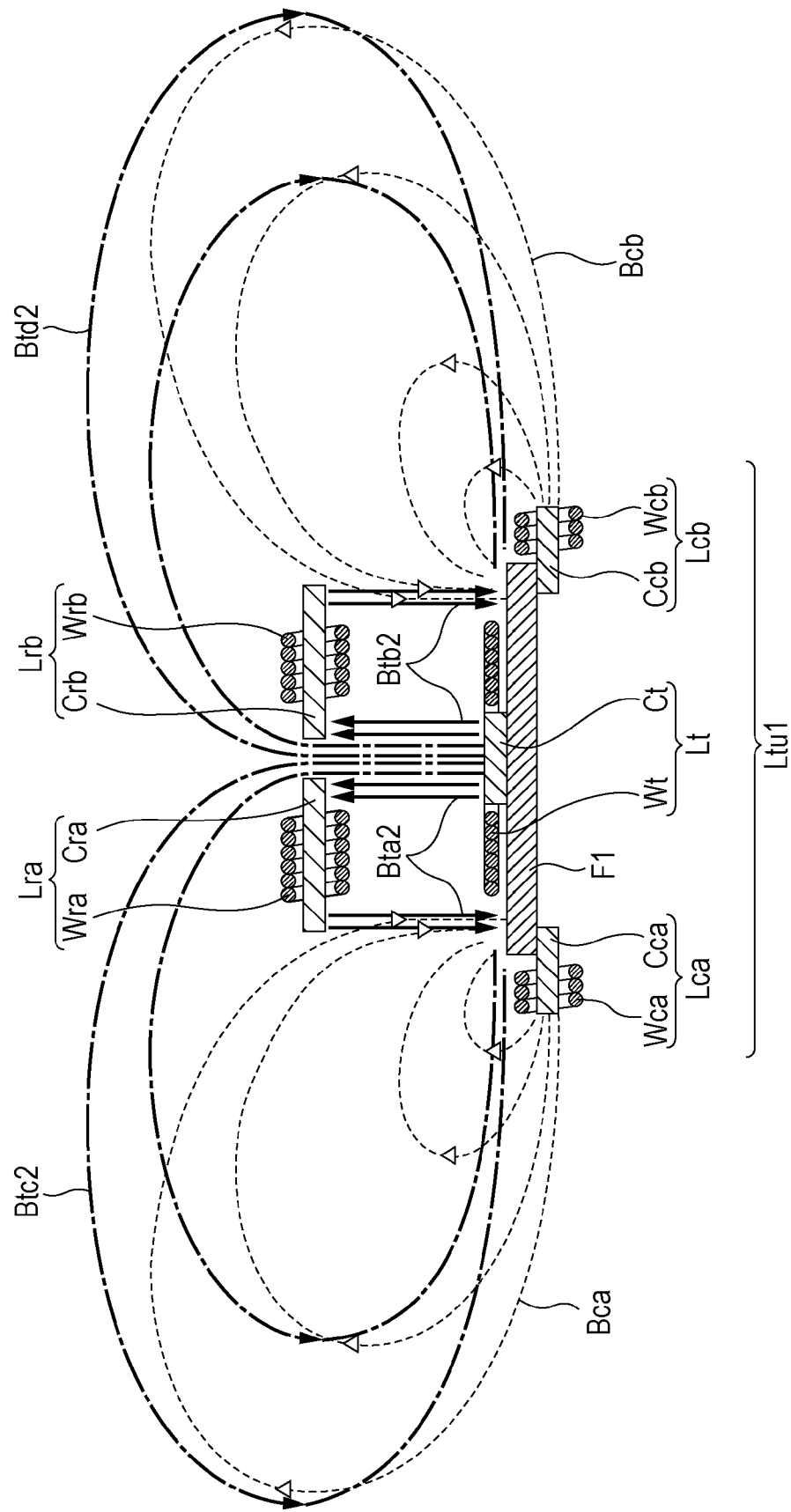
FIG. 7B is a diagram schematically illustrating the magnetic flux generated by the power feeding coil and first and second auxiliary coils in FIG. 6.

The relative relationship between the magnetic flux generated by a power feeding coil and the magnetic flux generated by an auxiliary coil and the effect of reducing the unwanted leakage magnetic field in this embodiment will now be described in detail with reference to FIGS. 7A and 7B. FIG. 7A is a diagram schematically illustrating the magnetic flux generated by the power feeding coil Lt in FIG. 6. FIG. 7B is a diagram schematically illustrating the magnetic flux generated by the power feeding coil Lt and the first and second auxiliary coils Lca and Lcb in FIG. 6. In FIG. 7A, magnetic fluxes Bta2 to Btd2 are illustrated as typical magnetic fluxes generated by the power feeding coil Lt. In FIG. 7B, magnetic fluxes Bta2 to Btd2 are illustrated as typical magnetic fluxes generated by the power feeding coil Lt, and magnetic fluxes Bca and Bcb are schematically illustrated as typical magnetic fluxes generated by the first and second auxiliary coils Lca and Lcb. Note that the illustrated magnetic fluxes schematically depict only the orientations of the individual magnetic fluxes, and do not depict the magnetic flux densities. In FIG. 7A and FIG. 7B, the magnetic flux in the magnetic core Ct of the power feeding coil. Lt, the magnetic cores Cca and Ccb of the first and second auxiliary coils Lca and Lcb, the magnetic body F1, and the magnetic cores Cra and Crb of the first and second power receiving coils Lra and Ltb is not illustrated.

First, the magnetic flux generated by the power feeding coil Lt will be described with reference to FIG. 7A. As illustrated in FIG. 7A, the power feeding coil Lt generates the magnetic fluxes Bta2 to Btd2 that interlink in the direction from a center portion of the power feeding coil Lt to the first and second power receiving coils Lra and Lrb (i.e., vertically upward in FIG. 7A). In the illustrated example, the magnetic fluxes Bta2 to Btd2 generated by the power feeding coil Lt include the magnetic flux Bta2 that interlinks with the first power receiving coil Lra and that contributes to power transmission, the magnetic flux Btb2 that interlinks with the second power receiving coil Lrb and that contributes to power transmission, and the magnetic fluxes Btc2 and Btd2 that circulate in a location away from the power feeding coil Lt without interlinking with the first and second power receiving coils Lra and Lrb. The interlinking of the magnetic flux Bta2 with the first power receiving coil Lra, and the interlinking of the magnetic flux Btb2 with the second power receiving coil Lrb induce an electromotive force in the wires Wra and Wrb of the first and second power receiving coils Lra and Lrb. The power generated in the first and second power receiving coils Lra and Lrb is rectified by the rectifier circuit DB, and is output to the load R.

The magnetic flux generated by the first and second auxiliary coils Lca and Lcb will now be described with reference to FIG. 7B. The magnetic fluxes Bta2 to Btd2 generated by the power feeding coil Lt in FIG. 7B are as illustrated in FIG. 7A. As illustrated in FIG. 7B, the first auxiliary coil Lca generates the magnetic flux Bca that interlinks the first auxiliary coil Lca in the direction from the power feeding coil Lt to the first auxiliary coil Lca (i.e., horizontally leftward in FIG. 7B) and that does not interlink with the power feeding coil Lt and the first and second power receiving coils Lra and Lrb and circulates in the direction from the first power receiving coil Lra to the first auxiliary coil. Lca (i.e., vertically downward in FIG. 7B). Specifically, since the axial direction of the first auxiliary coil Lca is nonparallel to the axial direction of the power feeding coil Lt, the magnetic flux Bca generated by the first auxiliary coil Lca circulates in a location away from the first auxiliary coil Lca without interlinking with the first and second power receiving coils Lra and Lrb. In particular, in this embodiment, since the axial direction of the first auxiliary coil Lca is perpendicular to the axial direction of the power feeding coil Lt, the magnetic flux Bca generated by the first auxiliary coil Lca largely circulates also in a location away from the first auxiliary coil Lca.

Likewise, as illustrated in FIG. 7B, the second auxiliary coil Lcb generates the magnetic flux Bcb that interlinks the second auxiliary coil Lcb in the direction from the power feeding coil Lt to the second auxiliary coil Lcb (i.e., horizontally rightward in FIG. 7B) and that does not interlink with the power feeding coil Lt and the first and second power receiving coils Lra and Lrb and circulates in the direction from the second power receiving coil Lrb to the second auxiliary coil Lcb (i.e., vertically downward in FIG. 7B). Specifically, since the axial direction of the second auxiliary coil Lcb is nonparallel to the axial direction of the power feeding coil Lt, the magnetic flux Bcb generated by the second auxiliary coil Lcb circulates in a location away from the second auxiliary coil Lcb without interlinking with the first and second power receiving coils Lra and Lrb. In particular, in this embodiment, since the axial direction of the second auxiliary coil Lcb is perpendicular to the axial direction of the power feeding coil Lt, the magnetic flux Bcb generated by the second auxiliary coil Lcb largely circulates also in a location away from the second auxiliary coil Lcb.

Next, the effect of reducing the unwanted leakage magnetic field in this embodiment will be described. Among the magnetic fluxes Bta2 to Btd2 generated by the power feeding coil Lt described above, the magnetic fluxes Btc2 and Btd2 are magnetic fluxes that largely circulate also in a location away from the power feeding coil Lt. That is, a leakage magnetic field is formed in a location away from the power feeding coil Lt by using the magnetic fluxes Btc2 and Btd2. The magnetic fluxes Btc2 and Btd2 that largely circulate also in a location away from the power feeding coil Lt have a significantly lower magnetic flux density than the magnetic fluxes Bta2 and Btb2 that circulate in the vicinity of the power feeding coil Lt. However, a large current flowing in a coil for high-power transmission may permit the leakage magnetic field formed in a location away from the power feeding coil Lt by using the magnetic fluxes Btc2 and Btd2 to have a strength that might be enough to cause electromagnetic interference. When a comparison is made between the orientation of the magnetic flux Btc2 generated by the power feeding coil Lt and the orientation of the magnetic flux Bca generated by the first auxiliary coil Lca in a location away from the power feeding coil Lt, the magnetic flux Btc2 and the magnetic flux Bca are oriented in opposite directions. Similarly, when a comparison is made between the orientation of the magnetic flux Btd2 generated by the power feeding coil Lt and the orientation of the magnetic flux Bcb generated by the second auxiliary coil. Lcb in a location away from the power feeding coil Lt, the magnetic flux Btd2 and the magnetic flux Bcb are oriented in opposite directions. That is, the magnetic fluxes Btc2 and Btd2 generated by the power feeding coil Lt and the magnetic fluxes Bca and Bcb generated by the first and second auxiliary coils Lca and Lcb cancel each other out in a location away from the power feeding coil Lt. As a result, the unwanted leakage magnetic field may be reduced.

On the other hand, the magnetic flux Bta2 generated by the power feeding coil Lt and the magnetic flux Bca generated by the first auxiliary coil Lca are oriented in the same direction near between the power feeding coil Lt and the first and second power receiving coils Lra and Lrb. That is, the magnetic field generated by the first auxiliary coil Lca enhances a part of the magnetic field between the power feeding coil Lt and the first and second power receiving coils Lra and Lrb. In this manner, the magnetic flux Bta2 generated by the power feeding coil Lt and the magnetic flux Bca generated by the first auxiliary coil Lca are oriented in substantially the same direction between the power feeding coil Lt and the first and second power receiving coils Lra and Lrb. Accordingly, the magnetic flux Bta2 interlinking both the power feeding coil Lt and the first and second power receiving coils Lra and Lrb, which contributes to power transmission, is not canceled by the magnetic flux Bca generated by the first auxiliary coil Lca. As a result, a reduction in power transmission efficiency may be prevented or minimized. Similarly, the magnetic flux Btb2 generated by the power feeding coil Lt and the magnetic flux Bcb generated by the second auxiliary coil Lcb are oriented in the same direction. That is, the magnetic field generated by the second auxiliary coil Lcb enhances a part of the magnetic field between the power feeding coil Lt and the first and second power receiving coils Lra and Lrb. In this manner, the magnetic flux Btb2 generated by the power feeding coil Lt and the magnetic flux Bcb generated by the second auxiliary coil Lcb are oriented in substantially the same direction between the power feeding coil Lt and the first and second power receiving coils Lra and Lrb. Accordingly, the magnetic flux Btb2 interlinking both the power feeding coil Lt and the first and second power receiving coils Lra and Lrb, which contributes to power transmission, is not canceled by the magnetic flux Bcb generated by the second auxiliary coil Lcb. As a result, a reduction in power transmission efficiency may be prevented or minimized.

In the manner described above, in the power feeding coil unit Ltu1 according to this embodiment, the first and second auxiliary coils Lca and Lcb are located on the rear side of the power feeding coil Lt outside of the region defined by the wire Wt of the power feeding coil Lt when viewed from the axial direction of the power feeding coil Lt. In addition, the axes of the first and second auxiliary coils Lca and Lcb are nonparallel to the axis of the power feeding coil Lt, and the power feeding coil Lt and the first and second auxiliary coils Lca and Lcb simultaneously generate respective magnetic fluxes, each magnetic flux interlinking the corresponding one of the power feeding coil Lt and the first and second auxiliary coils Lca and Lcb, in a direction from the center to the outside of the power feeding coil unit Ltu1. Thus, the magnetic fluxes Btc2 and Btd2 generated by the power feeding coil Lt and the magnetic fluxes Bca and Bcb generated by the first and second auxiliary coils Lca and Lcb are oriented in opposite directions in a location away from the power feeding coil Lt, whereas the magnetic fluxes Bta2 and Btb2 generated by the power feeding coil Lt and the magnetic fluxes Bca and Bcb generated by the first and second auxiliary coils Lca and Lcb are oriented in the same direction in the vicinity of the power feeding coil Lt. Accordingly, the magnetic field strength in a location away from the power feeding coil Lt decreases, whereas the magnetic field strength in the vicinity of the power feeding coil. Lt increases. As a result, a reduction in power transmission efficiency may be prevented or minimized with a reduction in an unwanted leakage magnetic field formed in a location away from the power feeding coil Lt.

Third Embodiment

Figure 8:
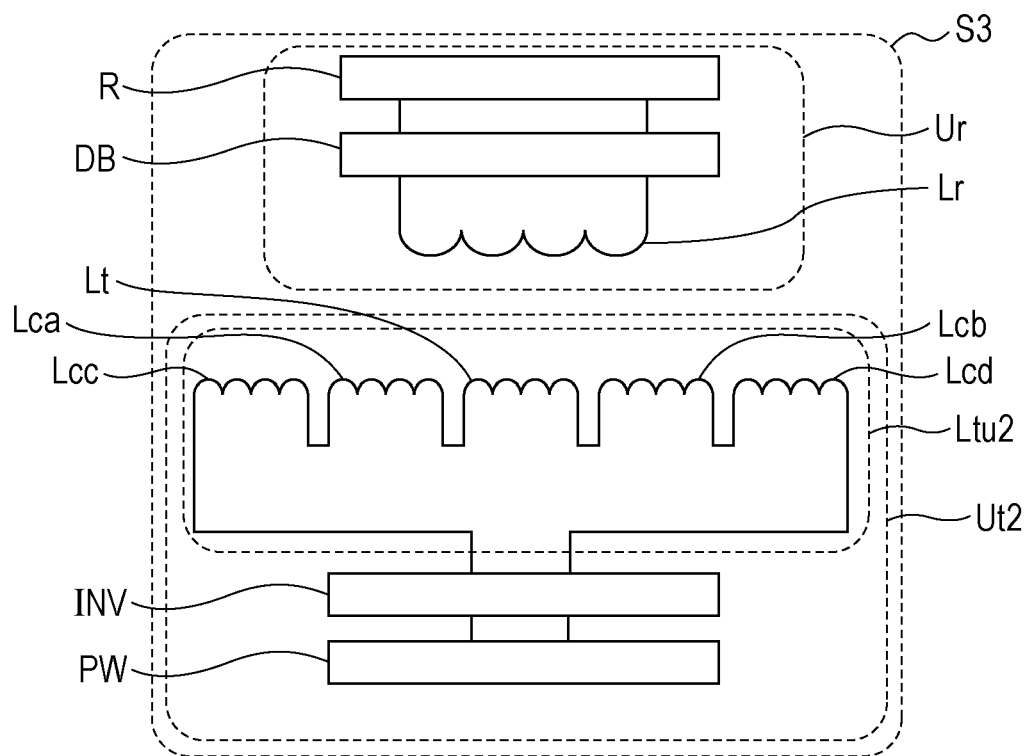
FIG. 8 is a system configuration diagram illustrating a wireless power transmission device according to a third embodiment of the present invention together with a load.
Figure 9:
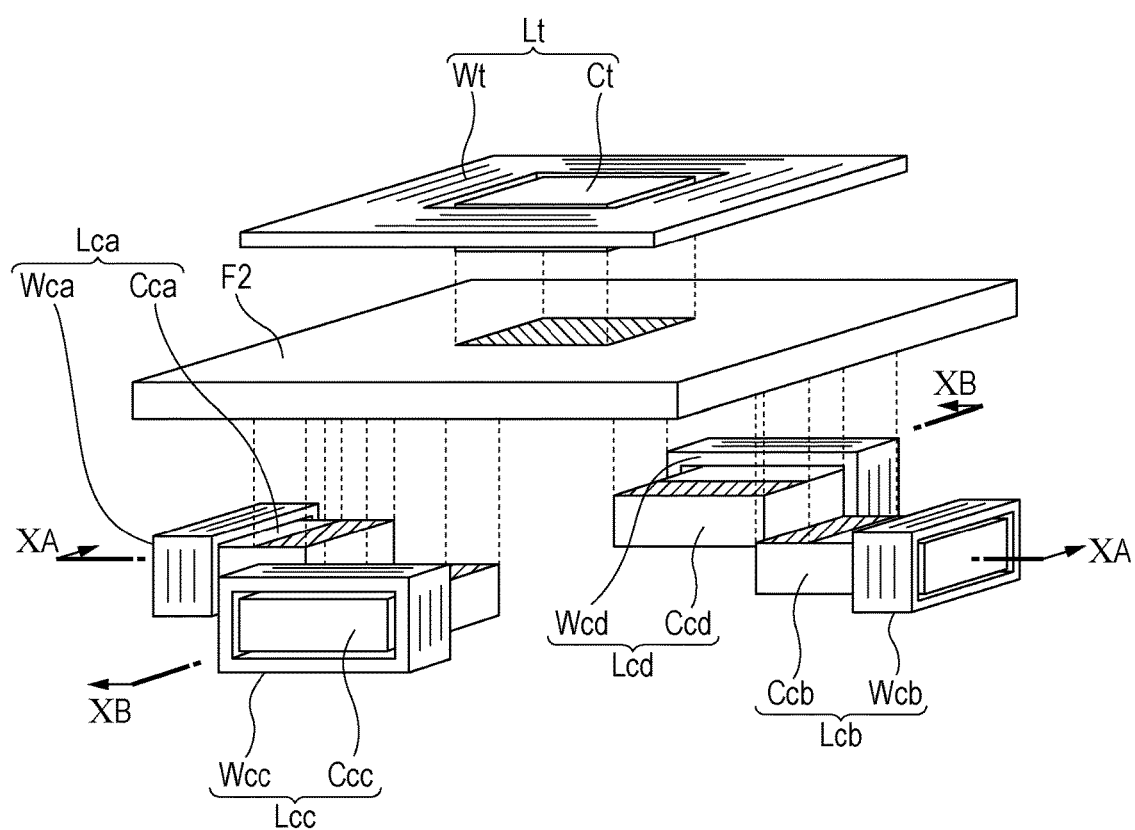
FIG. 9 is an exploded perspective view of a power feeding coil unit according to the third embodiment of the present invention.
Figure 10A:
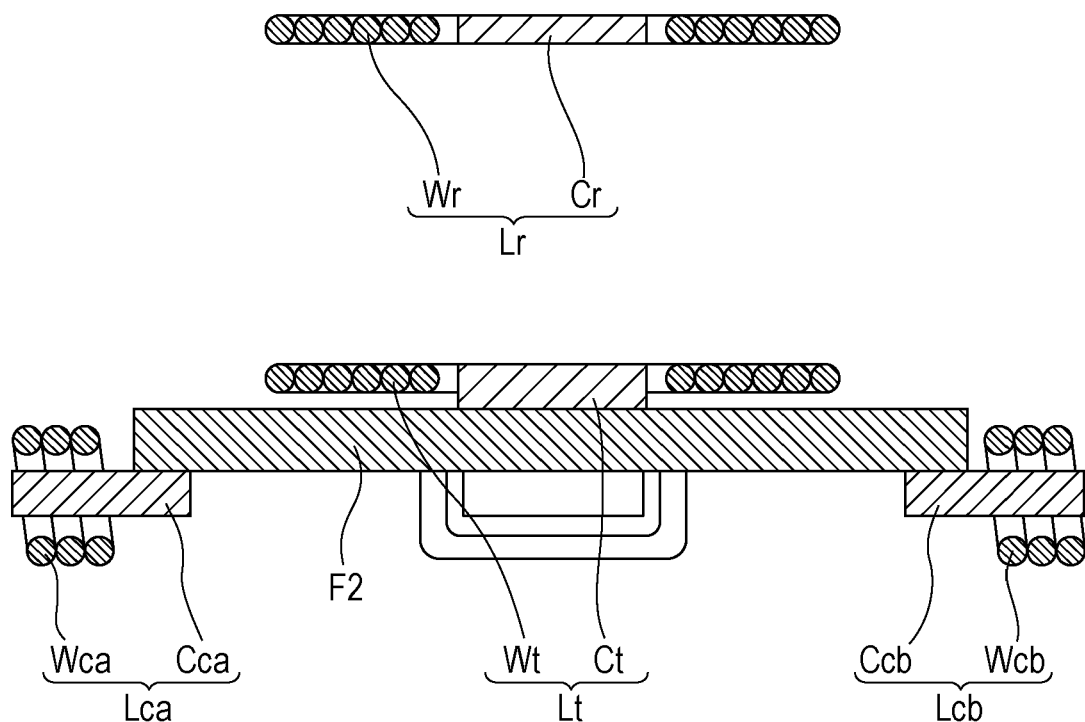
FIG. 10A is a schematic cross-sectional view of the power feeding coil unit, taken along line XA-XA in FIG. 9, together with a power receiving coil.
Figure 10B:
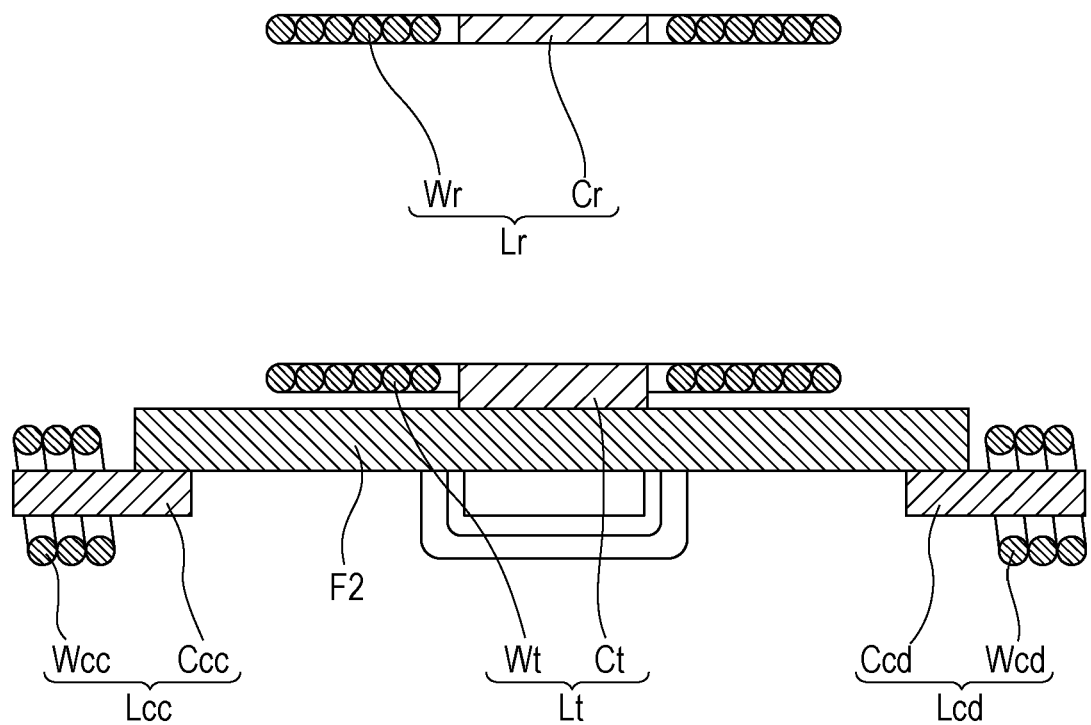
FIG. 10B is a schematic cross-sectional view of the power feeding coil unit, taken along line XB-XB in FIG. 9, together with the power receiving coil.

Next, a configuration of a wireless power transmission device S3 according to a third embodiment of the present invention will be described with reference to FIGS. 8, 9, 10A, and 10B. FIG. 8 is a system configuration diagram illustrating a wireless power transmission device according to the third embodiment of the present invention together with a load. FIG. 9 is an exploded perspective view of a power feeding coil unit according to the third embodiment of the present invention. FIG. 10A is a schematic cross-sectional view of the power feeding coil unit, taken along line XA-XA in FIG. 9, together with a power receiving coil.

FIG. 10 is a schematic cross-sectional view of the power feeding coil unit, taken along line XB-XB in FIG. 9, together with the power receiving coil.

As illustrated in FIG. 8, the wireless power transmission device S3 includes a wireless power feeding device Ut2 and a wireless power receiving device Ur. The wireless power feeding device Ut2 includes a power source PW, an inverter INV, and a power feeding coil unit Ltu2. The wireless power receiving device Ur includes a power receiving coil Lr and a rectifier circuit DB. The configuration of the power source PW, the inverter INV, the power receiving coil Lr, and the rectifier circuit DB is similar to that in the wireless power transmission device S1 according to the first embodiment. The wireless power transmission device S3 according to this embodiment is different from the wireless power transmission device S1 according to the first embodiment in that the wireless power transmission device S3 includes the power feeding coil unit Ltu2 in place of the power feeding coil unit Ltu1 of the wireless power transmission device S1 according to the first embodiment. In the following, a description will be given mainly of the differences from the first embodiment.

The power feeding coil unit Ltu2 includes a power feeding coil Lt, first auxiliary coils Lca and Lcc, second auxiliary coils Lcb and Lcd, and a magnetic body F2. The configuration of the power feeding coil Lt, the first auxiliary coil Lca, and the second auxiliary coil Lcb is similar to that in the wireless power transmission device S1 according to the first embodiment. The power feeding coil unit Ltu2 according to this embodiment is different from the power feeding coil unit Ltu1 according to the first embodiment in that the power feeding coil unit Ltu2 includes, in addition to the set of first and second auxiliary coils Lca and Lcb, another set of first and second auxiliary coils Lcc and Lcd. As illustrated in FIG. 8, five coils, that is, the power feeding coil Lt, the first auxiliary coils Lca and Lcc, and the second auxiliary coils Lcb and Lcd, are electrically connected in series with one another.

As illustrated in FIG. 9, the first and second auxiliary coils Lcc and Lcd are arranged so that an imaginary line connecting the center of the first auxiliary coil Lcc and the center of the second auxiliary coil Lcd is perpendicular to an imaginary line connecting the center of the first auxiliary coil Lca and the center of the second auxiliary coil Lcb.

The first auxiliary coil Lcc includes a magnetic core Ccc and a wire Wcc. The first auxiliary coil. Lcc is a solenoid coil having a wire wound in a helical shape, and is formed by winding the wire Wcc, which is made of a Litz wire such as a copper wire or an aluminum wire, around the magnetic core Ccc, which is shaped into a plate or a bar. The axial direction of the first auxiliary coil Lcc is nonparallel to the axial direction of the power feeding coil Lt. The configuration described above allows the magnetic flux generated by the first auxiliary coil Lcc to easily circulate also in a location away from the first auxiliary coil Lcc without interlinking with the power receiving coil Lr described below. In this embodiment, the axial direction of the first auxiliary coil Lcc is perpendicular to the axial direction of the power feeding coil Lt. In this case, the first auxiliary coil Lcc more facilitates the generation of a magnetic flux circulating also in a location away from the first auxiliary coil Lcc.

In addition, the first auxiliary coil Lcc is located on the rear side of the power feeding coil Lt. That is, the first auxiliary coil Lcc is located on the opposite to a side of the power feeding coil Lt facing the power receiving coil Lr. The arrangement described above allows the first auxiliary coil Lcc to easily generate a magnetic flux that enhances a part of the magnetic field between the power feeding coil Lt and the power receiving coil Lr. As a result, a reduction in power transmission efficiency may further be prevented or minimized.

Furthermore, when the power feeding coil Lt generates a magnetic flux interlinking the power feeding coil Lt in the direction from the center to the outside of the power feeding coil unit Ltu2, the first auxiliary coil Lcc generates a magnetic flux interlinking the first auxiliary coil Lcc in the direction from the center to the outside of the power feeding coil unit Ltu2. Specifically, in FIG. 10B, when the magnetic flux generated by the power feeding coil Lt interlinks the power feeding coil Lt in the direction from the power feeding coil Lt to the power receiving coil Lr (i.e., vertically upward in FIG. 10B), it may be sufficient that the magnetic flux generated by the first auxiliary coil Lcc interlinks the first auxiliary coil Lcc in the direction from the power feeding coil Lt to the first auxiliary coil Lcc (i.e., horizontally leftward in FIG. 10B). In order to generate the magnetic flux described above, in FIG. 10B, it may be sufficient to wind the wire Wcc of the first auxiliary coil Lcc around the magnetic core Ccc so that the direction of the current flowing through a portion of the wire Wcc of the first auxiliary coil Lcc in closest proximity to the wire Wt of the power feeding coil Lt (i.e., the upper portion of the wire Wcc of the first auxiliary coil Lcc in FIG. 10B) is opposite to the direction of the current flowing through a portion of the wire Wt of the power feeding coil Lt in most proximity to the wire Wcc of the first auxiliary coil Lcc (i.e., the left-hand portion of the wire Wt of the power feeding coil Lt in FIG. 10B). In this embodiment, the power feeding coil Lt and the first auxiliary coil Lcc are electrically connected in series with each other. With the configuration of the power feeding coil Lt and the first auxiliary coil Lcc described above, when the power feeding coil Lt generates a magnetic flux interlinking the power feeding coil Lt in the direction from the outside to the center of the power feeding coil unit Ltu2, the first auxiliary coil Lcc also generates a magnetic flux interlinking the first auxiliary coil Lcc in the direction from the outside to the center of the power feeding coil unit Ltu2.

The second auxiliary coil Lcd includes a magnetic core Ccd and a wire Wcd. The second auxiliary coil Lcd is a solenoid coil having a wire wound in a helical shape, and is formed by winding the wire Wcd, which is made of a Litz wire such as a copper wire or an aluminum wire, around the magnetic core Ccd, which is shaped into a plate or a bar. The axial direction of the second auxiliary coil Lcd is nonparallel to the axial direction of the power feeding coil. Lt. The configuration described above allows the magnetic flux generated by the second auxiliary coil Lcd to easily circulate also in a location away from the second auxiliary coil Lcd without interlinking with the power receiving coil Lr described below. In this embodiment, the axial direction of the second auxiliary coil Lcd is perpendicular to the axial direction of the power feeding coil Lt. In this case, the second auxiliary coil Lcd more facilitates the generation of a magnetic flux circulating also in a location away from the second auxiliary coil Lcd.

In addition, the second auxiliary coil Lcd is located on the rear side of the power feeding coil Lt. That is, the second auxiliary coil Lcd is located on the opposite to the side of the power feeding coil Lt facing the power receiving coil Lr. The arrangement described above allows the second auxiliary coil Lcd to easily generate a magnetic flux that enhances a part of the magnetic field between the power feeding coil Lt and the power receiving coil Lr. As a result, a reduction in power transmission efficiency may further be prevented or minimized.

Furthermore, when the power feeding coil Lt generates a magnetic flux interlinking the power feeding coil Lt in the direction from the center to the outside of the power feeding coil unit Ltu2, the second auxiliary coil Lcd generates a magnetic flux interlinking the second auxiliary coil Lcd in the direction from the center to the outside of the power feeding coil unit Ltu2. Specifically, in FIG. 10B, when the magnetic flux generated by the power feeding coil Lt interlinks the power feeding coil Lt in the direction from the power feeding coil Lt to the power receiving coil Lr (i.e., vertically upward in FIG. 10B), it may be sufficient that the magnetic flux generated by the second auxiliary coil Lcd interlinks the second auxiliary coil Lcd in the direction from the power feeding coil Lt to the second auxiliary coil Lcd (i.e., horizontally rightward in FIG. 10B). In order to generate the magnetic flux described above, in FIG. 10B, it may be sufficient to wind the wire Wcd of the second auxiliary coil Lcd around the magnetic core Ccd so that the direction of the current flowing through a portion of the wire Wcd of the second auxiliary coil Lcd in closest proximity to the wire Wt of the power feeding coil Lt (i.e., the upper portion of the wire Wcd of the second auxiliary coil Lcd in FIG. 10B) is the same as the direction of the current flowing through a portion of the wire Wt of the power feeding coil Lt in most proximity to the wire Wcd of the second auxiliary coil Lcd (i.e., the right-hand portion of the wire Wt of the power feeding coil Lt in FIG. 10B). In this embodiment, the power feeding coil Lt and the second auxiliary coil Lcd are electrically connected in series with each other. With the configuration of the power feeding coil Lt and the second auxiliary coil Lcd described above, when the power feeding coil Lt generates a magnetic flux interlinking the power feeding coil Lt in the direction from the outside to the center of the power feeding coil unit Ltu2, the second auxiliary coil Lcd also generates a magnetic flux interlinking the second auxiliary coil Lcd in the direction from the outside to the center of the power feeding coil unit Ltu2.

The magnetic body F2 extends along the opposite surface to a side of the power feeding coil Lt facing the power receiving coil Lr. When the magnetic body F2 is viewed from the axial direction of the power feeding coil Lt, the external dimensions of the magnetic body F2 are larger than the external dimensions of the power feeding coil Lt. In this embodiment, the magnetic body F2 and the magnetic core Ct of the power feeding coil Lt are connected to each other near the center of the surface on the side of the magnetic body F2 facing the power receiving coil Lr. In addition, the magnetic body F2 is connected to the magnetic cores Cca and Ccc of the first auxiliary coils Lca and Lcc and to the magnetic cores Ccb and Ccd of the second auxiliary coils Lcb and Lcd near the center of the respective sides of the magnetic body F2 on the opposite surface to a side of the magnetic body F2 facing the power receiving coil Lr. Here, the first auxiliary coils Lca and Lcc and the second auxiliary coils Lcb and Lcd are arranged so that an imaginary line connecting the center of the first auxiliary coil Lcc and the center of the second auxiliary coil Lcd is perpendicular to an imaginary line connecting the center of the first auxiliary coil Lca and the center of the second auxiliary coil Lcb. Thus, the first and second auxiliary coils Lca and Lcb are arranged so that the power feeding coil. Lt is located between the first and second auxiliary coils Lca and Lcb when viewed from the axial direction of the power feeding coil Lt. Similarly, the first and second auxiliary coils Lcc and Lcd are arranged so that the power feeding coil Lt is located between the first and second auxiliary coils Lcc and Lcd. Accordingly, the first and second auxiliary coils Lca and Lcb are configured to be located on both outer sides of the power feeding coil Lt, and the first and second auxiliary coils Lcc and Lcd are configured to be located on both outer sides of the power feeding coil Lt. Thus, a further reduction in an unwanted leakage magnetic field formed in a location away from the power feeding coil Lt may be achieved.

Figure 11A:
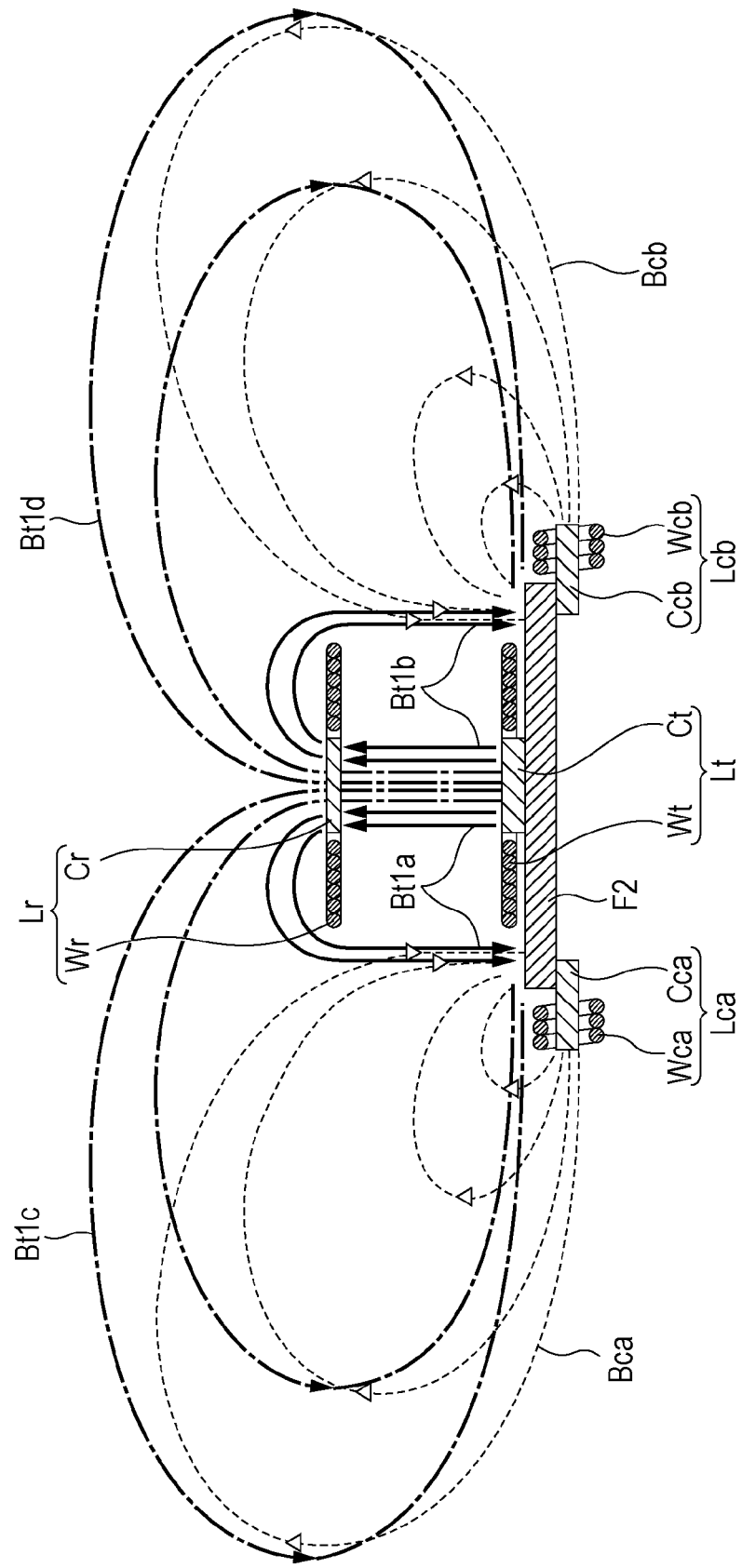
FIG. 11A is a diagram schematically illustrating the magnetic flux generated by a power feeding coil and first and second auxiliary coils in FIG. 10A.

The relative relationship between the magnetic flux generated by a power feeding coil and the magnetic flux generated by an auxiliary coil and the effect of reducing the unwanted leakage magnetic field in this embodiment will now be described in detail with reference to FIGS. 11A and 11B. FIG. 11A is a diagram schematically illustrating the magnetic flux generated by the power feeding coil Lt and the first and second auxiliary coils Lca and Lcb in FIG. 10A. FIG. 11B is a diagram schematically illustrating the magnetic flux generated by the power feeding coil Lt and the first and second auxiliary coils Lcc and Lcd in FIG. 10B. In FIG. 11A, magnetic fluxes $Bt1a$ to $Bt1d$ are illustrated as typical magnetic fluxes generated by the power feeding coil Lt, and the magnetic fluxes Bca and Bcb are schematically illustrated as typical magnetic fluxes generated by the first and second auxiliary coils Lca and Lcb. In FIG. 11B, magnetic fluxes $Bt2a$ to $Bt2d$ are illustrated as typical magnetic fluxes generated by the power feeding coil Lt, and magnetic fluxes Bcc and Bcd are schematically illustrated as typical magnetic fluxes generated by the first and second auxiliary coils Lcc and Lcd. Note that the illustrated magnetic fluxes schematically depict only the orientations of the individual magnetic fluxes, and do not depict the magnetic flux densities. In FIG. 11A and FIG. 11B, the magnetic flux in the magnetic core Ct of the power feeding coil. Lt, the magnetic cores Cca, Ccc, Ccb, and Ccd of the first and second auxiliary coils Lca, Lcc, Lcb, and Lcd, the magnetic body F2, and the magnetic core Cr of the power receiving coil Lr is not illustrated.

First, the magnetic flux generated by the power feeding coil Lt and the magnetic flux generated by the first and second auxiliary coils Lca and Lcb will be described in detail with reference to FIG. 11A. As illustrated in FIG. 11A, the power feeding coil Lt generates the magnetic fluxes $Bt1a$ to $Bt1d$ that interlink in the direction from a center portion of the power feeding coil Lt to the power receiving coil Lr (i.e., vertically upward in FIG. 11A). The magnetic fluxes $Bt1a$ to $Bt1d$ generated by the power feeding coil Lt also interlink with the power receiving coil Lr. The interlinking of the magnetic fluxes $Bt1a$ to $Bt1d$ with the power receiving coil Lr induces an electromotive force in the wire Wr of the power receiving coil Lr. The power generated in the power receiving coil Lr is rectified by the rectifier circuit DB, and is output to the load R.

As illustrated in FIG. 11A, the first auxiliary coil Lca generates a magnetic flux Bca that interlinks the first auxiliary coil Lca in the direction from the power feeding coil Lt to the first auxiliary coil Lca (i.e., horizontally leftward in FIG. 11A) and that does not interlink with the power feeding coil Lt and the power receiving coil Lr and circulates in the direction from the power receiving coil Lr to the first auxiliary coil Lca (i.e., vertically downward in FIG. 11A). Specifically, since the axial direction of the first auxiliary coil Lca is nonparallel to the axial direction of the power feeding coil Lt, the magnetic flux Bca generated by the first auxiliary coil Lca circulates in a location away from the first auxiliary coil Lca without interlinking with the power receiving coil Lr. In particular, in this embodiment, since the axial direction of the first auxiliary coil Lca is perpendicular to the axial direction of the power feeding coil Lt, the magnetic flux Bca generated by the first auxiliary coil Lca largely circulates also in a location away from the first auxiliary coil Lca.

Likewise, as illustrated in FIG. 11A, the second auxiliary coil Lcb generates a magnetic flux Bcb that interlinks the second auxiliary coil Lcb in the direction from the power feeding coil Lt to the second auxiliary coil Lcb (i.e., horizontally rightward in FIG. 11A) and that does not interlink with the power feeding coil Lt and the power receiving coil Lr and circulates in the direction from the power receiving coil Lr to the second auxiliary coil Lcb (i.e., vertically downward in FIG. 11A). Specifically, since the axial direction of the second auxiliary coil Lcb is nonparallel to the axial direction of the power feeding coil. Lt, the magnetic flux Bcb generated by the second auxiliary coil Lcb circulates in a location away from the second auxiliary coil Lcb without interlinking with the power receiving coil Lr. In particular, in this embodiment, since the axial direction of the second auxiliary coil Lcb is perpendicular to the axial direction of the power feeding coil Lt, the magnetic flux Bcb generated by the second auxiliary coil Lcb largely circulates also in a location away from the second auxiliary coil Lcb.

Next, the effect of reducing the unwanted leakage magnetic field by using the first and second auxiliary coils Lca and Lcb will be described. Among the magnetic fluxes Bt1$a$ to Bt1$d$ generated by the power feeding coil Lt described above, the magnetic fluxes Bt1$a$ and Bt1$b$ are magnetic fluxes that circulate relatively in the vicinity of the power feeding coil Lt, and the magnetic fluxes Bt1$c$ and Bt1$d$ are magnetic fluxes that largely circulate also in a location away from the power feeding coil Lt. That is, a leakage magnetic field is formed in a location away from the power feeding coil Lt by using the magnetic fluxes Bt1$c$ and Bt1$d$. The magnetic fluxes Bt1$c$ and Bt1$d$ that largely circulate also in a location away from the power feeding coil Lt have a significantly lower magnetic flux density than the magnetic fluxes Bt1$a$ and Bt1$b$ that circulate in the vicinity of the power feeding coil Lt. However, a large current flowing in a coil for high-power transmission may permit the leakage magnetic field formed in a location away from the power feeding coil Lt by using the magnetic fluxes Bt1$c$ and Bt1$d$ to have a strength that might be enough to cause electromagnetic interference. When a comparison is made between the orientation of the magnetic flux Bt1$c$ generated by the power feeding coil Lt and the orientation of the magnetic flux Bca generated by the first auxiliary coil Lca in a location away from the power feeding coil Lt, the magnetic flux Bt1$c$ and the magnetic flux Bca are oriented in opposite directions. Similarly, when a comparison is made between the orientation of the magnetic flux Bt1$d$ generated by the power feeding coil Lt and the orientation of the magnetic flux Bcb generated by the second auxiliary coil Lcb in a location away from the power feeding coil Lt, the magnetic flux Bt1$d$ and the magnetic flux Bcb are oriented in opposite directions. That is, the magnetic fluxes Bt1$c$ and Bt1$d$ generated by the power feeding coil Lt and the magnetic fluxes Bca and Bcb generated by the first and second auxiliary coils Lca and Lcb cancel each other out in a location away from the power feeding coil Lt. As a result, the unwanted leakage magnetic field may be reduced.

On the other hand, the magnetic flux Bt1$a$ generated by the power feeding coil Lt and the magnetic flux Bca generated by the first auxiliary coil Lca are oriented in the same direction near between the power feeding coil Lt and the power receiving coil Lr. That is, the magnetic field generated by the first auxiliary coil Lca enhances a part of the magnetic field between the power feeding coil Lt and the power receiving coil Lr. In this manner, the magnetic flux Bt1$a$ generated by the power feeding coil Lt and the magnetic flux Bca generated by the first auxiliary coil Lca are oriented in substantially the same direction between the power feeding coil Lt and the power receiving coil Lr. Accordingly, the magnetic flux Bt1$a$ interlinking both the power feeding coil Lt and the power receiving coil Lr, which contributes to power transmission, is not canceled by the magnetic flux Bca generated by the first auxiliary coil Lca. As a result, a reduction in power transmission efficiency may be prevented or minimized. Similarly, the magnetic flux Bt1$b$ generated by the power feeding coil Lt and the magnetic flux Bcb generated by the second auxiliary coil Lcb are oriented in the same direction. That is, the magnetic field generated by the second auxiliary coil Lcb enhances a part of the magnetic field between the power feeding coil Lt and the power receiving coil Lr. In this manner, the magnetic flux Bt1$b$ generated by the power feeding coil Lt and the magnetic flux Bcb generated by the second auxiliary coil Lcb are oriented in substantially the same direction between the power feeding coil Lt and the power receiving coil Lr. Accordingly, the magnetic flux Bt1$b$ interlinking both the power feeding coil Lt and the power receiving coil Lr, which contributes to power transmission, is not canceled by the magnetic flux Bcb generated by the second auxiliary coil Lcb. As a result, a reduction in power transmission efficiency may be prevented or minimized. As described above, among the magnetic fluxes Bt1$a$ to Bt1$d$ interlinking both the power feeding coil Lt and the power receiving coil Lr, the magnetic fluxes Bt1$c$ and Bt1$d$ that circulate also in a location away from the power feeding coil Lt are canceled by the magnetic fluxes Bca and Bcb generated by the first and second auxiliary coils Lca and Lcb. The magnetic fluxes Bt1$c$ and Bt1$d$ that largely circulate also in a location away from the power feeding coil Lt have a significantly lower magnetic flux density than the magnetic fluxes Bt1$a$ and Bt1$b$ that circulate in the vicinity of the power feeding coil Lt. Accordingly, a reduction in power transmission efficiency due to the cancellation of the magnetic fluxes Bt1$c$ and Bt1$d$ that largely circulate also in a location away from the power feeding coil Lt is not significant.

The magnetic flux generated by the power feeding coil Lt and the magnetic flux generated by the first and second auxiliary coils Lcc and Lcd will now be described in detail with reference to FIG. 11B. As illustrated in FIG. 11B, the power feeding coil Lt generates the magnetic fluxes Bt2$a$ to Bt2$d$ that interlink in the direction from a center portion of the power feeding coil Lt to the power receiving coil Lr (i.e., vertically upward in FIG. 11B). The magnetic fluxes Bt2$a$ to Bt2$d$ generated by the power feeding coil Lt also interlink with the power receiving coil Lr. The interlinking of the magnetic fluxes Bt2$a$ to Bt2$d$ with the power receiving coil Lr induces an electromotive force in the wire Wr of the power receiving coil Lr. The power generated in the power receiving coil Lr is rectified by the rectifier circuit DB, and is output to the load R.

As illustrated in FIG. 11B, the first auxiliary coil Lcc generates a magnetic flux Bcc that interlinks the first auxiliary coil Lcc in the direction from the power feeding coil Lt to the first auxiliary coil Lcc (i.e., horizontally leftward in FIG. 11B) and that does not interlink with the power feeding coil Lt and the power receiving coil Lr and circulates in the direction from the power receiving coil Lr to the first auxiliary coil Lcc (i.e., vertically downward in FIG. 11B). Specifically, since the axial direction of the first auxiliary coil Lcc is nonparallel to the axial direction of the power feeding coil Lt, the magnetic flux Bcc generated by the first auxiliary coil Lcc circulates in a location away from the first auxiliary coil Lcc without interlinking with the power receiving coil Lr. In particular, in this embodiment, since the axial direction of the first auxiliary coil Lcc is perpendicular to the axial direction of the power feeding coil. Lt, the magnetic flux Bcc generated by the first auxiliary coil Lcc largely circulates also in a location away from the first auxiliary coil Lcc.

Likewise, as illustrated in FIG. 11B, the second auxiliary coil Lcd generates a magnetic flux Bcd that interlinks the second auxiliary coil Lcd in the direction from the power feeding coil Lt to the second auxiliary coil Lcd (i.e., horizontally rightward in FIG. 11B) and that does not interlink with the power feeding coil Lt and the power receiving coil Lr and circulates in the direction from the power receiving coil Lr to the second auxiliary coil Lcd (i.e., vertically downward in FIG. 11B). Specifically, since the axial direction of the second auxiliary coil Lcd is nonparallel to the axial direction of the power feeding coil Lt, the magnetic flux Bcd generated by the second auxiliary coil Lcd circulates in a location away from the second auxiliary coil Lcd without interlinking with the power receiving coil Lr. In particular, in this embodiment, since the axial direction of the second auxiliary coil Lcd is perpendicular to the axial direction of the power feeding coil Lt, the magnetic flux Bcd generated by the second auxiliary coil Lcd largely circulates also in a location away from the second auxiliary coil Lcd.

Next, the effect of reducing the unwanted leakage magnetic field by using the first and second auxiliary coils Lcc and Lcd will be described. Among the magnetic fluxes Bt2a to Bt2d generated by the power feeding coil Lt described above, the magnetic fluxes Bt2a and Bt2b are magnetic fluxes that circulate relatively in the vicinity of the power feeding coil Lt, and the magnetic fluxes Bt2c and Bt2d are magnetic fluxes that largely circulate also in a location away from the power feeding coil Lt. That is, a leakage magnetic field is formed in a location away from the power feeding coil Lt by using the magnetic fluxes Bt2c and Bt2d. The magnetic fluxes Bt2c and Bt2d that largely circulate also in a location away from the power feeding coil Lt have a significantly lower magnetic flux density than the magnetic fluxes Bt2a and Bt2b that circulate in the vicinity of the power feeding coil Lt. However, a large current flowing in a coil for high-power transmission may permit the leakage magnetic field formed in a location away from the power feeding coil Lt by using the magnetic fluxes Bt2c and Bt2d to have a strength that might be enough to cause electromagnetic interference. When a comparison is made between the orientation of the magnetic flux Bt2c generated by the power feeding coil Lt and the orientation of the magnetic flux Bcc generated by the first auxiliary coil. Lcc in a location away from the power feeding coil Lt, the magnetic flux Bt2c and the magnetic flux Bcc are oriented in opposite directions. Similarly, when a comparison is made between the orientation of the magnetic flux Bt2d generated by the power feeding coil Lt and the orientation of the magnetic flux Bcd generated by the second auxiliary coil Lcd in a location away from the power feeding coil Lt, the magnetic flux Bt2d and the magnetic flux Bcd are oriented in opposite directions. That is, the magnetic fluxes Bt2c and Bt2d generated by the power feeding coil Lt and the magnetic fluxes Bcc and Bcd generated by the first and second auxiliary coils Lcc and Lcd cancel each other out in a location away from the power feeding coil Lt. As a result, the unwanted leakage magnetic field may be reduced.

On the other hand, the magnetic flux Bt2a generated by the power feeding coil Lt and the magnetic flux Bcc generated by the first auxiliary coil Lcc are oriented in the same direction near between the power feeding coil Lt and the power receiving coil Lr. That is, the magnetic field generated by the first auxiliary coil Lcc enhances a part of the magnetic field between the power feeding coil Lt and the power receiving coil Lr. In this manner, the magnetic flux Bt2a generated by the power feeding coil Lt and the magnetic flux Bcc generated by the first auxiliary coil Lcc are oriented in substantially the same direction between the power feeding coil Lt and the power receiving coil Lr. Accordingly, the magnetic flux Bt2a interlinking both the power feeding coil Lt and the power receiving coil Lr, which contributes to power transmission, is not canceled by the magnetic flux Bcc generated by the first auxiliary coil Lcc. As a result, a reduction in power transmission efficiency may be prevented or minimized. Similarly, the magnetic flux Bt2b generated by the power feeding coil Lt and the magnetic flux Bcd generated by the second auxiliary coil Lcd are oriented in the same direction. That is, the magnetic field generated by the second auxiliary coil Lcd enhances a part of the magnetic field between the power feeding coil. Lt and the power receiving coil Lr. In this manner, the magnetic flux Bt2b generated by the power feeding coil Lt and the magnetic flux Bcd generated by the second auxiliary coil Lcd are oriented in substantially the same direction between the power feeding coil Lt and the power receiving coil Lr. Accordingly, the magnetic flux Bt2b interlinking both the power feeding coil Lt and the power receiving coil Lr, which contributes to power transmission, is not canceled by the magnetic flux Bcd generated by the second auxiliary coil Lcd. As a result, a reduction in power transmission efficiency may be prevented or minimized. As described above, among the magnetic fluxes Bt2a to Bt2d interlinking both the power feeding coil Lt and the power receiving coil Lr, the magnetic fluxes Bt2c and Bt2d that circulate also in a location away from the power feeding coil Lt are canceled by the magnetic fluxes Bcc and Bcd generated by the first and second auxiliary coils Lcc and Lcd. The magnetic fluxes Bt2c and Bt2d that largely circulate also in a location away from the power feeding coil Lt have a significantly lower magnetic flux density than the magnetic fluxes Bt2a and Bt2b that circulate in the vicinity of the power feeding coil Lt. Accordingly, a reduction in power transmission efficiency due to the cancellation of the magnetic fluxes Bt2c and Bt2d that largely circulate also in a location away from the power feeding coil. Lt is not significant.

In the manner described above, in the power feeding coil unit Ltu2 according to this embodiment, the first and second auxiliary coils Lca, Lcc, Lcb, and Lcd are located on the rear side of the power feeding coil Lt outside of the region defined by the wire Wt of the power feeding coil. Lt when viewed from the axial direction of the power feeding coil Lt. In addition, the axes of the first and second auxiliary coils Lca, Lcc, Lcb, and Lcd are nonparallel to the axis of the power feeding coil Lt, and the power feeding coil Lt and the first and second auxiliary coils Lca, Lcc, Lcb, and Lcd simultaneously generate respective magnetic fluxes, each magnetic flux interlinking the corresponding one of the power feeding coil Lt and the first and second auxiliary coils Lca, Lcc, Lcb, and Lcd, in a direction from the center to the outside of the power feeding coil unit Ltu2. Thus, the magnetic fluxes Bt1c, Bt1d, Bt2c, and Bt2d generated by the power feeding coil Lt and the magnetic fluxes Bca to Bcd generated by the first and second auxiliary coils Lca to Lcd are oriented in opposite directions in a location away from the power feeding coil Lt, whereas the magnetic fluxes Bt1a, Bt1b, Bt2a, and Bt2b generated by the power feeding coil Lt and the magnetic fluxes Bca to Bcd generated by the first and second auxiliary coils Lca to Lcd are oriented in the same direction in the vicinity of the power feeding coil Lt. Accordingly, the magnetic field strength in a location away from the power feeding coil Lt decreases, whereas the magnetic field strength in the vicinity of the power feeding coil Lt increases. As a result, a reduction in power transmission efficiency may be prevented or minimized with a reduction in an unwanted leakage magnetic field formed in a location away from the power feeding coil Lt.

In the power feeding coil unit Ltu2 according to this embodiment, furthermore, a plurality of first auxiliary coils and a plurality of second auxiliary coils, namely, the first auxiliary coils Lca and Lcb and the second auxiliary coils Lcc and Lcd, are provided, and an imaginary line connecting the center of the first auxiliary coil Lca and the center of the second auxiliary coil Lcb in one of the pairs is nonparallel to an imaginary line connecting the center of the first auxiliary coil Lcc and the center of the second auxiliary coil Lcd in the other pair. Accordingly, a region where the strength of a magnetic field generated in a location away from the power feeding coil Lt can be reduced is expanded. Thus, the effect of reducing an unwanted leakage magnetic field formed in a location away from the power feeding coil Lt may further be enhanced.

Hereinafter, advantages achievable with the exemplary embodiments disclosed herein, which prevent or minimize a reduction in power transmission efficiency while reducing an unwanted leakage magnetic field formed in a location away from a power feeding coil, will be specifically described with reference to Example 1 and Comparative Examples 1 and 2.

In Example 1, the wireless power transmission device S1 according to the first embodiment described above was used. In Comparative Example 1, for comparison with Example 1 in terms of characteristics, a wireless power transmission device configured such that the wireless power transmission device S1 according to the first embodiment does not include an auxiliary coil was used. In Comparative Example 2, for comparison with Example 1 in terms of characteristics, a wireless power transmission device configured such that a noise canceling coil Ln20 that interlinks with a magnetic flux created by a power feeding coil is added to Comparative Example 1 was used.

Figure 12:
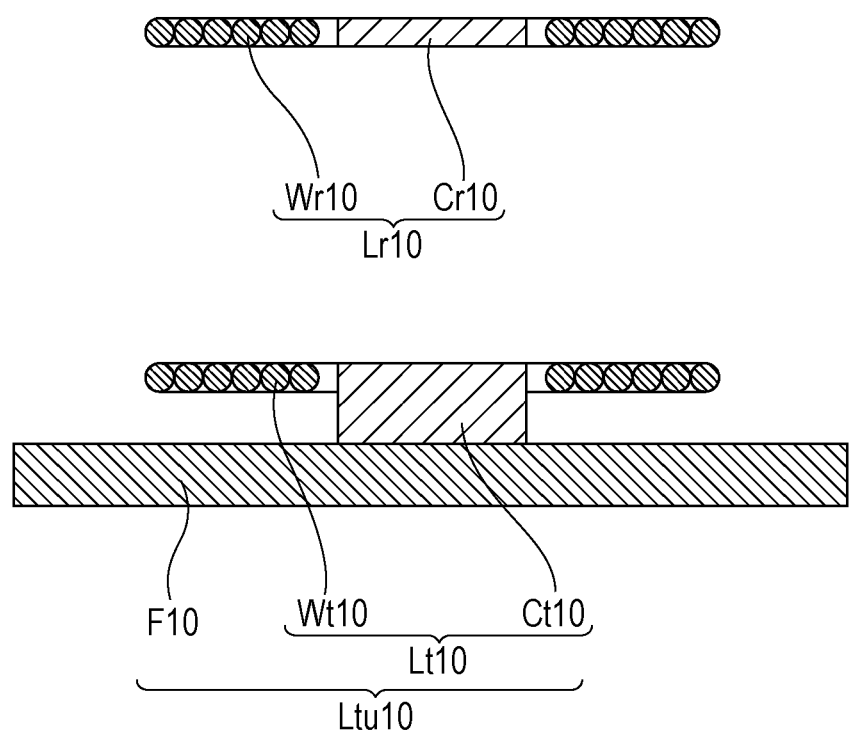
FIG. 12 is a cross-sectional view illustrating a power feeding coil unit in Comparative Example 1 together with a power receiving coil.

First, the configuration of a power feeding coil unit Ltu10 and a power receiving coil Lr10 in the wireless power transmission device in Comparative Example 1 will be described with reference to FIG. 12. FIG. 12 is a cross-sectional view illustrating the power feeding coil unit in Comparative Example 1 together with the power receiving coil Lr10. The power feeding coil unit Ltu10 includes a magnetic body F10 and a power feeding coil Lt10. The power feeding coil Lt10 is a planar-shaped spiral coil having a substantially rectangular shape, and is formed by, as illustrated in FIG. 12, winding a wire Wt10 around a magnetic core Ct10. The magnetic core Ct10 is connected to the magnetic body F10. The power feeding coil unit Ltu10 in Comparative Example 1 is equivalent to a configuration in which the first auxiliary coil Lca and the second auxiliary coil Lcb are excluded from the power feeding coil unit Ltu1 of the wireless power transmission device S1 in Example 1. The power receiving coil Lr10 is a spiral coil having a wire wound in a planar shape. The power receiving coil Lr10 in Comparative Example 1 is similar to the power receiving coil Lr in the wireless power transmission device S1 in Example 1.

Figure 13:
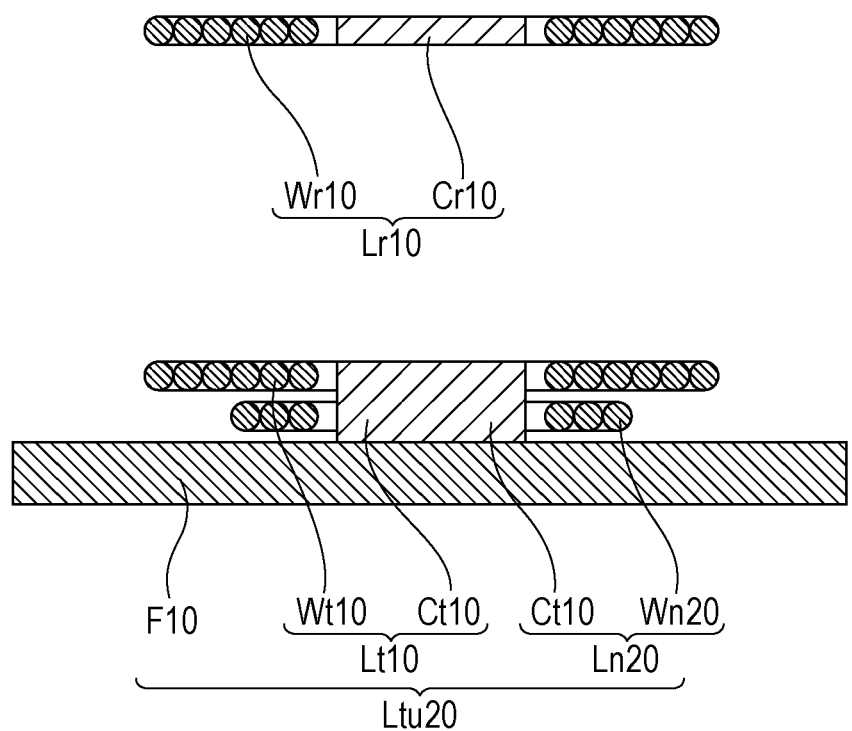
FIG. 13 is a cross-sectional view illustrating a power feeding coil unit in Comparative Example 2 together with a power receiving coil.

Next, the configuration of a power feeding coil unit Ltu20 and a power receiving coil Lr10 in the wireless power transmission device in Comparative Example 2 will be described with reference to FIG. 13. FIG. 13 is a cross-sectional view illustrating the power feeding coil unit in Comparative Example 2 together with the power receiving coil Lr10. The power feeding coil unit Ltu20 includes a magnetic body F10, a power feeding coil Lt10, and a noise canceling coil Ln20. The power feeding coil unit Ltu20 in Comparative Example 2 is equivalent to a configuration in which the noise canceling coil Ln20 is added to the power feeding coil unit Ltu10 in Comparative Example 1. The noise canceling coil Ln20 is a planar-shaped spiral coil having a substantially rectangular shape. As illustrated in FIG. 13, a wire Wn20 of the noise canceling coil Ln20 is wound around the magnetic core Ct10 between the power feeding coil Lt10 and the magnetic body F10. The configuration described above allows the noise canceling coil Ln20 to interlink with a magnetic flux created by the power feeding coil Lt10. Here, the noise canceling coil Ln20 is wound in a direction opposite to the direction in which the power feeding coil Lt10 is wound. In addition, the power receiving coil Lr10 is similar to the power receiving coil Lr in the wireless power transmission device S1 in Example 1.

Here, in Example 1 and Comparative Examples 1 and 2, a Litz wire with a diameter of approximately 6 mm which is formed by twisting approximately 4000 polyimide-coated copper wires each having a diameter of 0.05 mm was used for each of the wires Wt and Wt10 of the power feeding coils Lt and Lt10, the wires Wca and Wcb of the first and second auxiliary coils Lca and Lcb, the wire Wn20 of the noise canceling coil Ln20, and the wires Wr and Wr10 of the power receiving coils Lr and Lr10. In addition, ferrite cores of the same material (with a relative magnetic permeability of approximately 3000) were used for the magnetic cores Ct and Ct10 of the power feeding coils Lt and Lt10, the magnetic cores Cca and Ccb of the first and second auxiliary coils Lca and Lcb, the magnetic bodies F1 and F10, and the magnetic cores Cr and Cr10 of the power receiving coils Lr and Lr10.

Furthermore, in the power feeding coil unit Ltu1 in Example 1, the magnetic body F1 having a length of 400 mm, a width of 300 mm, and a thickness of 15 mm, the magnetic core Ct of the power feeding coil Lt having a length of 100 mm, a width of 300 mm, and a thickness of 24 mm, the magnetic cores Cca and Ccb of the first and second auxiliary coils Lca and Lcb each having a length of 40 mm, a width of 300 mm, and a thickness of 15 mm, and the magnetic core Cr of the power receiving coil Lr having a length of 100 mm, a width of 300 mm, and a thickness of 24 mm were used. In the power feeding coil unit Ltu10 in Comparative Example 1 and the power feeding coil unit Ltu20 in Comparative Example 2, the magnetic body F10 having a length of 400 mm, a width of 300 mm, and a thickness of 15 mm, the magnetic core Ct10 of the power feeding coil Lt10 having a length of 100 mm, a width of 300 mm, and a thickness of 24 mm, and the magnetic core Cr10 of the power receiving coil Lr10 having a length of 100 mm, a width of 300 mm, and a thickness of 24 mm were used.

Moreover, in Example 1 and Comparative Examples 1 and 2, the number of turns of each of the power feeding coils Lt and Lt10 and the power receiving coils Lr and Lr10 was set to 20. In Example 1, the number of turns of each of the first and second auxiliary coils Lca and Lcb was set to 5. In Comparative Example 2, the number of turns of the noise canceling coil Ln20 was set to 10.

In Example 1 and Comparative Examples 1 and 2, the distance between the power feeding coil unit Ltu1 and the power receiving coil Lr was set to 150 mm, and the distance between each of the power feeding coil units Ltu10 and Ltu20 and the power receiving coil Lr10 was set to 150 mm.

Then, in Example 1 and Comparative Examples 1 and 2, the power transmission efficiency and the unwanted leakage magnetic field were measured. This measurement was conducted with no displacement of the power receiving coils Lr and Lr10, that is, with the distance between the power feeding coil units Ltu1, Ltu10, and Ltu20 and the power receiving coils Lr and Lr10 being kept at 150 mm while the distance between the center of each of the power feeding coil units Ltu1, Ltu10, and Ltu20 and the center of each of the power receiving coils Lr and Lr10 was also 150 mm. The supply power of the power source PW was adjusted so that the power to be supplied to the load R became equal to 3 kW.

The power transmission efficiency was measured as follows: The efficiency between the power feeding coil unit and the power receiving coil was calculated by measuring the power supplied from the power source PW and the power supplied to the load R while taking into account the loss at the inverter INV and the loss at the rectifier circuit DB, which were measured in advance.

The unwanted leakage magnetic field was determined using, as an index, the magnetic field strength at a position 5 m away from the center of the power feeding coil unit. A loop antenna was placed at a position 5 m away from the center of the power feeding coil unit in the longitudinal direction of the magnetic body F1 or F10 to measure the magnetic field strength. Here, the loop antenna was used to measure the magnetic field strengths in three orthogonal directions (X, Y, and Z directions), and the magnetic field strengths were combined to calculate a leakage magnetic field strength. Note that the power feeding coil unit was placed at a height of 500 mm from the floor surface with a power transmitting surface thereof facing upward, and the power receiving coil was placed above the power feeding coil unit with an interval of 150 mm between them. In addition, the loop antenna was placed in such a manner that the center of the loop antenna was positioned at a height of 1.5 m from the floor of a radio-frequency (RF) anechoic chamber.

Figure 14:
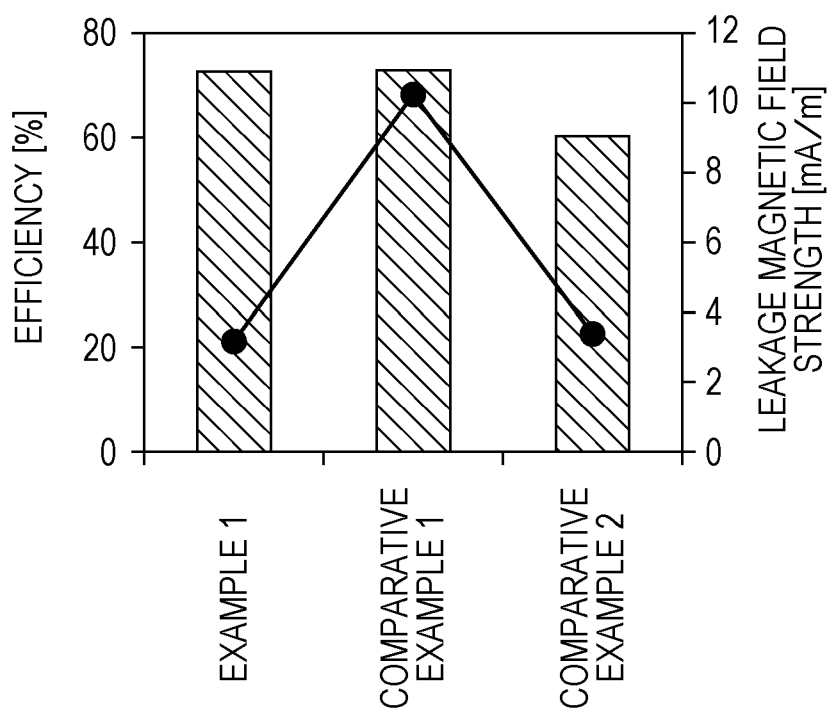
FIG. 14 depicts the results of measurement of the power transmission efficiency and the leakage magnetic field strength in Example 1 according to the present invention and Comparative Examples 1 and 2.

Measurement results of Example 1 and Comparative Examples 1 and 2 are shown in FIG. 14. In FIG. 14, a bar graph depicts power transmission efficiency, and a line graph depicts leakage magnetic field strength.

First, the results of the measurement in Example 1 and Comparative Examples 1 and 2 will be examined. As illustrated in FIG. 14, compared to Comparative Example 1, Example 1 exhibits slightly lower but substantially equal power transmission efficiency, and lower leakage magnetic field strength. In addition, compared to Comparative Example 2, Example 1 exhibits higher power transmission efficiency and substantially equal leakage magnetic field strength. That is, the auxiliary coil in Example 1 (i.e., the first and second auxiliary coils Lca and Lcb) does not cancel out a magnetic flux contributing to power transmission, and thus a reduction in power transmission efficiency is prevented, compared to Comparative Example 1 in which no auxiliary coil is provided. In Example 1, furthermore, the auxiliary coil cancels out a magnetic flux that forms the unwanted leakage magnetic field, and thus the leakage magnetic field strength is significantly reduced, compared to Comparative Example 1 in which no auxiliary coil is provided. In Comparative Example 2, in contrast, it is contemplated that both the power transmission efficiency and the leakage magnetic field strength will have been reduced by the noise canceling coil (Ln20) canceling out both a magnetic flux that contributes to power transmission and a magnetic flux that forms the unwanted leakage magnetic field. In the manner described above, it has been found that the power feeding coil unit Ltu1 in Example 1 is capable of preventing or minimizing a reduction in power transmission efficiency while reducing the unwanted leakage magnetic field.

The present invention has been described with reference to some embodiments thereof. Such embodiments are illustrative, and it is to be understood by a person skilled in the art that various modifications and changes can be made within the scope of the present invention and that such modifications and changes also fall within the scope of the present invention. Accordingly, the description given herein and the drawings taken in conjunction therewith are to be illustrative but not restrictive.

What is claimed is:

1. A power feeding coil unit for wirelessly feeding power, comprising:
   a power feeding coil having a wire wound in a planar shape; and
   at least one pair of auxiliary coils, each pair including a first auxiliary coil and a second auxiliary coil, the at least one pair of auxiliary coils being located on a rear side of the power feeding coil and located completely outside of the region defined by the wire of the power feeding coil when viewed from an axial direction of the power feeding coil, wherein
   the at least one pair of auxiliary coils does not overlap the region defined by the wire of the power feeding coil when viewed from the axial direction of the power feeding coil,
   an axis of the first auxiliary coil and an axis of the second auxiliary coil are nonparallel to an axis of the power feeding coil, and
   the power feeding coil, the first auxiliary coil, and the second auxiliary coil simultaneously generate respective magnetic fluxes, each of which interlinks the corresponding one of the power feeding coil, the first auxiliary coil, and the second auxiliary coil in a direction from a center to an outside of the power feeding coil unit.

2. The power feeding coil unit according to claim 1, wherein
   the axis of the first auxiliary coil and the axis of the second auxiliary coil are substantially perpendicular to the axis of the power feeding coil.

3. The power feeding coil unit according to claim 1, wherein
   the power feeding coil further includes a magnetic core, and each of the first auxiliary coil and the second auxiliary coil includes a magnetic core,
   the magnetic core of the first auxiliary coil is coupled to the magnetic core of the power feeding coil, and
   the magnetic core of the second auxiliary coil is coupled to the magnetic core of the power feeding coil.

4. The power feeding coil unit according to claim 1, wherein
   the first auxiliary coil and the second auxiliary coil are arranged so that the power feeding coil is located between the first auxiliary coil and the second auxiliary coil when viewed from the axial direction of the power feeding coil.

5. The power feeding coil unit according to claim 4, wherein
the at least one pair of auxiliary coils comprises a plurality of pairs of auxiliary coils, each pair including a first auxiliary coil and a second auxiliary coil, and
an imaginary line connecting a center of the first auxiliary coil and a center of the second auxiliary coil in each of the plurality of pairs is nonparallel to an imaginary line connecting a center of the first auxiliary coil and a center of the second auxiliary coil in another of the plurality of pairs.

6. The power feeding coil unit according to claim 3, further comprising
a magnetic body that is connected to the magnetic core of the power feeding coil, the magnetic core of the first auxiliary coil, and the magnetic core of the second auxiliary coil, the magnetic body being located, relative to the axial direction of the power feeding coil, between the power feeding coil and the at least one pair of auxiliary coils, such that, relative to the axial direction of the power feeding coil, the power feeding coil is located on the front side of the magnetic body and the at least one pair of auxiliary coils is located on a rear side of the magnetic body.

* * * * *